US012298986B2

(12) United States Patent
Zhou et al.

(10) Patent No.: US 12,298,986 B2
(45) Date of Patent: *May 13, 2025

(54) SEARCH RESULT RANKING AND PRESENTATION

(71) Applicant: GOOGLE LLC, Mountain View, CA (US)

(72) Inventors: Chen Zhou, Shanghai (CN); Chen Ding, Beijing (CN); David Francois Huynh, San Francisco, CA (US); JinYu Lou, Shanghi (CN); Yanlai Huang, Shanghai (CN); Hongda Shen, Sunnyvale, CA (US); Guanghua Li, Santa Clara, CA (US); Yiming Li, Gainesville, FL (US); Yangyang Chai, Shanghai (CN)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,443

(22) Filed: Nov. 28, 2023

(65) Prior Publication Data

US 2024/0095252 A1    Mar. 21, 2024

Related U.S. Application Data

(63) Continuation of application No. 17/816,529, filed on Aug. 1, 2022, now Pat. No. 11,868,357, which is a
(Continued)

(51) Int. Cl.
*G06F 16/2457* (2019.01)
*G06F 16/2452* (2019.01)
(Continued)

(52) U.S. Cl.
CPC .. *G06F 16/24578* (2019.01); *G06F 16/24526* (2019.01); *G06F 16/248* (2019.01);
(Continued)

(58) Field of Classification Search
CPC .... G06F 16/248; G06F 16/338; G06F 16/438; G06F 16/538; G06F 16/638;
(Continued)

(56) References Cited

U.S. PATENT DOCUMENTS 5,276,870 A   1/1994   Shan et al.
5,553,226 A   9/1996   Kiuchi et al.
(Continued)

FOREIGN PATENT DOCUMENTS

CN   1609852 A     4/2005
CN   101341464 A   1/2009
(Continued)

OTHER PUBLICATIONS

Elliott, Bruce, U.S. Appl. No. 13/606,494, "Systems and Methods for Displaying Schedule Information," filed Sep. 7, 2012, pp. 1-23.
(Continued)

*Primary Examiner* — Robert W Beausoliel, Jr.
*Assistant Examiner* — Nirav K Khakhar
(74) *Attorney, Agent, or Firm* — Brake Hughes Bellermann LLP

(57) ABSTRACT

Methods and systems are provided for ranking search results and generating a presentation. In some implementations, a search system generates a presentation based on a search query. In some implementations, a search system ranks search results based on data stored in a knowledge graph. In some implementations, a search system identifies a modifying concept such as a superlative in a received search query, and determines ranking properties based on the modifying concept.

18 Claims, 21 Drawing Sheets

Related U.S. Application Data continuation of application No. 16/584,229, filed on Sep. 26, 2019, now Pat. No. 11,403,301, which is a continuation of application No. 15/205,624, filed on Jul. 8, 2016, now Pat. No. 10,445,328, which is a continuation of application No. 13/570,043, filed on Aug. 8, 2012, now Pat. No. 9,390,174.

(51) Int. Cl.
  *G06F 16/248* (2019.01)
  *G06F 16/901* (2019.01)
  *G06F 16/9038* (2019.01)
  *G06F 16/951* (2019.01)

(52) U.S. Cl.
  CPC ...... *G06F 16/9024* (2019.01); *G06F 16/9038* (2019.01); *G06F 16/951* (2019.01)

(58) Field of Classification Search
  CPC .. G06F 16/738; G06F 16/838; G06F 16/9038; G06F 16/9538
  See application file for complete search history.

(56) References Cited

U.S. PATENT DOCUMENTS

| | | | |
|---|---|---|---|
| 5,634,051 A | 5/1997 | Thomson | |
| 5,666,502 A | 9/1997 | Capps | |
| 5,826,257 A | 10/1998 | Snelling | |
| 5,870,559 A | 2/1999 | Leshem et al. | |
| 5,946,647 A | 8/1999 | Miller et al. | |
| 6,513,036 B2 | 1/2003 | Fruensgaard et al. | |
| 6,832,218 B1 | 12/2004 | Emens et al. | |
| 6,847,959 B1 | 1/2005 | Arrouye et al. | |
| 6,944,612 B2 | 9/2005 | Roustant et al. | |
| 7,502,770 B2 | 3/2009 | Hillis et al. | |
| 7,555,490 B1 | 6/2009 | Neal | |
| 7,562,076 B2 | 7/2009 | Kapur | |
| 7,565,139 B2 | 7/2009 | Neven et al. | |
| 7,603,374 B2 | 10/2009 | Cameron et al. | |
| 7,720,702 B2 | 5/2010 | Fredericks et al. | |
| 7,761,414 B2 | 7/2010 | Freedman | |
| 7,765,206 B2 | 7/2010 | Hillis et al. | |
| 7,797,336 B2 | 9/2010 | Blair et al. | |
| 7,818,324 B1 | 10/2010 | Held et al. | |
| 7,895,196 B2 | 2/2011 | Mahadevan et al. | |
| 7,933,900 B2 | 4/2011 | Reddy et al. | |
| 7,974,892 B2 | 7/2011 | Fredericks et al. | |
| 8,005,720 B2 | 8/2011 | King et al. | |
| 8,051,104 B2 | 11/2011 | Weissman et al. | |
| 8,069,175 B2 | 11/2011 | Hillis et al. | |
| 8,086,604 B2 | 12/2011 | Arrouye et al. | |
| 8,140,361 B2 | 3/2012 | Fredericks et al. | |
| 8,204,856 B2 | 6/2012 | Meyer et al. | |
| 8,286,885 B1 | 10/2012 | Zehr et al. | |
| 8,316,029 B2 | 11/2012 | Lawrence | |
| 8,429,103 B1 | 4/2013 | Aradhye et al. | |
| 8,661,023 B1 | 2/2014 | Chun et al. | |
| 8,775,356 B1 | 7/2014 | Chen et al. | |
| 9,183,203 B1 | 11/2015 | Tuchman et al. | |
| 9,471,606 B1 | 10/2016 | Pedregal et al. | |
| 11,403,301 B2 | 8/2022 | Zhou et al. | |
| 2002/0083039 A1 | 6/2002 | Ferrari et al. | |
| 2004/0093321 A1 | 5/2004 | Roustant et al. | |
| 2004/0221235 A1 | 11/2004 | Marchisio et al. | |
| 2004/0230585 A1 | 11/2004 | Middelfart | |
| 2004/0249809 A1 | 12/2004 | Ramani et al. | |
| 2004/0267700 A1 | 12/2004 | Dumais et al. | |
| 2005/0027694 A1 | 2/2005 | Sauermann | |
| 2005/0138018 A1 | 6/2005 | Sakai et al. | |
| 2005/0171940 A1 | 8/2005 | Fogg et al. | |
| 2005/0289455 A1 | 12/2005 | Hays et al. | |
| 2006/0026147 A1 | 2/2006 | Cone et al. | |
| 2006/0047649 A1 | 3/2006 | Liang | |
| 2007/0055947 A1 | 3/2007 | Ostojic et al. | |
| 2007/0179965 A1 | 8/2007 | Hogue et al. | |
| 2007/0188494 A1 | 8/2007 | Agutter et al. | |
| 2007/0260594 A1 | 11/2007 | Lewak et al. | |
| 2007/0260639 A1 | 11/2007 | Tobin et al. | |
| 2008/0010273 A1 | 1/2008 | Frank | |
| 2008/0065694 A1 | 3/2008 | Qian | |
| 2008/0126143 A1 | 5/2008 | Altman et al. | |
| 2008/0147627 A1 | 6/2008 | Natkovich et al. | |
| 2008/0222570 A1 | 9/2008 | MacLaurin et al. | |
| 2009/0058821 A1 | 3/2009 | Chaudhri et al. | |
| 2009/0150800 A1 | 6/2009 | Wood et al. | |
| 2009/0210389 A1 | 8/2009 | Firestein et al. | |
| 2009/0224867 A1 | 9/2009 | O'Shaughnessy et al. | |
| 2010/0070448 A1 | 3/2010 | Omoigui | |
| 2010/0153404 A1 | 6/2010 | Ghosh et al. | |
| 2010/0217756 A1 | 8/2010 | Guha | |
| 2010/0228693 A1 | 9/2010 | Dawson et al. | |
| 2010/0257154 A1 | 10/2010 | Pendap et al. | |
| 2010/0299343 A1 | 11/2010 | Ahari et al. | |
| 2011/0106850 A1 | 5/2011 | Li et al. | |
| 2011/0137883 A1 | 6/2011 | Lagad et al. | |
| 2011/0137919 A1 | 6/2011 | Ryu et al. | |
| 2011/0161311 A1 | 6/2011 | Mishne et al. | |
| 2011/0179084 A1 | 7/2011 | Waddington et al. | |
| 2011/0184981 A1 | 7/2011 | Lu et al. | |
| 2011/0202493 A1 | 8/2011 | Li | |
| 2011/0258006 A1 | 10/2011 | Koetting et al. | |
| 2011/0270884 A1 | 11/2011 | Li et al. | |
| 2011/0282861 A1 | 11/2011 | Bergstraesser et al. | |
| 2011/0307477 A1 | 12/2011 | Dasari et al. | |
| 2011/0314012 A1 | 12/2011 | Kenthapadi et al. | |
| 2011/0320441 A1 | 12/2011 | Lee et al. | |
| 2012/0059745 A1 | 3/2012 | Fredericks et al. | |
| 2012/0059838 A1 | 3/2012 | Berntson et al. | |
| 2012/0066627 A1 | 3/2012 | Furukawa et al. | |
| 2012/0101858 A1 | 4/2012 | Depasquale et al. | |
| 2012/0101901 A1 | 4/2012 | Depasquale et al. | |
| 2012/0150572 A1 | 6/2012 | Fredericks et al. | |
| 2012/0150836 A1 | 6/2012 | He et al. | |
| 2012/0158633 A1 | 6/2012 | Eder | |
| 2012/0159340 A1 | 6/2012 | Bae et al. | |
| 2012/0185425 A1 | 7/2012 | Reeves et al. | |
| 2012/0246153 A1 | 9/2012 | Pehle | |
| 2012/0317103 A1 | 12/2012 | Qiao | |
| 2012/0330906 A1 | 12/2012 | Fredericks et al. | |
| 2013/0018875 A1 | 1/2013 | Qiao | |
| 2013/0054542 A1 | 2/2013 | Ollenberger et al. | |
| 2013/0097181 A1 | 4/2013 | Sud et al. | |
| 2013/0103677 A1 | 4/2013 | Chakra et al. | |
| 2013/0110833 A1 | 5/2013 | Fredericks et al. | |
| 2013/0179418 A1 | 7/2013 | Wang et al. | |

FOREIGN PATENT DOCUMENTS

| | | |
|---|---|---|
| CN | 102243647 A | 11/2011 |
| CN | 102298612 A | 12/2011 |
| CN | 102298616 A | 12/2011 |
| JP | 2005165986 A | 6/2005 |
| JP | 2011186876 A | 9/2011 |
| WO | 0131479 A1 | 5/2001 |
| WO | 2006110480 A1 | 10/2006 |
| WO | 2010120925 A2 | 10/2010 |

OTHER PUBLICATIONS

Extended European Search Report for European Patent Application No. 13 828 073.0, mailed on Jun. 25, 2015, 7 pages.
International Search Report for International Application No. PCT/US2013/053662, mailed on Feb. 20, 2014, 3 pages.
De Marneffe , et al., "Stanford Typed Dependencies Manual", Sep. 2011, 24 pages.
Huynh , "Freebase Cubed: Text-based Collection Queries for Large, Richly Interconnected Data Sets", Proceedings of the Third Workshop on Human-Computer Interaction and Information Retrieval; http://cuaslis.org/hcir2009, Oct. 23, 2009, 4 pages.
Huynh , et al., "Paralax and Companion: Set-based Browsing for the Data Web", International World Wide Web Conference Committee (IW3C2), WWW 2009, Madrid, Spain, May 8-12, 2009, 10 pages.

(56) References Cited

OTHER PUBLICATIONS

Huynh , "VIMEO: Freebase Parallax: A novel way to browse and explore data", https://vimeo.com/1513562, uploaded on Aug. 11, 2008.
Kao, Wayne , "Telling the Story of Friendships", Facebook, available at http://blog.facebook.com/blog.php?post=443390892130, pp. 1-2., Oct. 28, 2010.
Lin , "Dependency-based Evaluation of MINIPAR", Workshop on the Evaluation of Parsing Systems, Granada, Spain, May 1, 1998, 14 pages.
Snow , et al., "Learning Syntactic Patterns for Automatic Hypernym Discovery", Jan. 1, 2011, 8 pages.
Stoyanov , et al., "Reconcile: A Coreference Resolution Research Platform", May 13, 2010, 14 pages.
Tripit , "Announcing Triplt—The First Intelligent Travel Organizer for Do-It-Yourself Trip Planners", Concur Technologies Inc., available at http://www.tripit.com/press/company-announcements/announcing-tripit-first-intelligent-travel-organizer-do-it-yourself-trip, Sep. 18, 2007, pp. 1-2.
Tripit , "Triplt Brings Travel Itineraries to Mobile Phones", Concur Technologies Inc., available at http://www.tripit.com/press/company-announcements/tripit-brings-travel-itineraries-mobile-phones, Apr. 7, 2008, pp. 1-2.
Tripit , "Triplt Simplifies Business Travel and Keeps Travelers Connected on the Road", Concur Technologies Inc., available at http://www.tripit.com/press/company-announcements/tripit-simplifies-business-travel-and-keeps-travelers-connected-road, Feb. 4, 2008, pp. 1-2.
U.S. Appl. No. 17/816,529, filed Aug. 1, 2022, Allowed.
U.S. Appl. No. 16/584,229, filed Sep. 26, 2019, Issued.
U.S. Appl. No. 15/205,624, filed Jul. 8, 2016, Issued.
U.S. Appl. No. 13/570,043, filed Aug. 8, 2012, Issued.

1100

```
┌─────────────────────────────────┐
│   Determine an entity reference │
│       from a search query       │
│              1102               │
└─────────────────────────────────┘
                │
                ▼
┌─────────────────────────────────────┐
│ Identify a ranked list of properties│
│ associated with a type of the entity│
│              reference              │
│                1104                 │
└─────────────────────────────────────┘
                │
                ▼
┌─────────────────────────────────┐
│     Identifying a property for  │
│      generating presentation    │
│              1106               │
└─────────────────────────────────┘
                │
                ▼
┌─────────────────────────────────┐
│ Determining a presentation      │
│         technique               │
│              1108               │
└─────────────────────────────────┘
                │
                ▼
┌─────────────────────────────────┐
│ Cause search results to be      │
│         presented               │
│              1110               │
└─────────────────────────────────┘
```

| Modifying Concepts 1802 ||||
|---|---|---|---|
| Explicit 1804 || Implicit 1806 ||
| Objective 1808 | Subjective 1822 | Objective 1816 | Subjective 1830 |
| Superlative 1810 | Superlative 1824 | Entity Type 1818 | Single Role Entity 1832 |
| Superlative with Range 1812 | Quality Score 1826 | Entity Property 1820 | Multiple Role Entity 1834 |
| Property with "by" 1814 | Soft Properties 1828 | | N:N Relationship 1836 |

```
Identify a modifying concept based on a search
query
1902
```

↓

```
Determine a rule for ranking search results
1904
```

↓

```
Rank search results based on the rule
1906
```

FIG. 19

SEARCH RESULT RANKING AND PRESENTATION

CROSS-REFERENCE TO RELATED APPLICATIONS

This application is a continuation of U.S. application Ser. No. 17/816,529, filed Aug. 1, 2022, which is a continuation of U.S. application Ser. No. 16/584,229, filed on Sep. 26, 2019, now U.S. Pat. No. 11,403,301, which is a continuation of U.S. application Ser. No. 15/205,624, filed on Jul. 8, 2016, now U.S. Pat. No. 10,445,328, which is a continuation of U.S. application Ser. No. 13/570,043, filed on Aug. 8, 2012, now U.S. Pat. No. 9,390,174, the disclosures of which are incorporated by reference herein in their entireties.

BACKGROUND

The present disclosure relates to a search system. Typically, search results are presented using a standard technique such as a list of text links. Search engines receive search queries from users and provide search results using, for example, a list of text links.

SUMMARY

Methods, systems, and computer readable media are provided for ranking search results and generating a presentation technique for presenting search results.

In some implementations, a computer implemented method for providing search results comprises determining, using one or more processors, an entity reference from a search query. A ranked list of properties associated with a type of the entity reference is identified based on a knowledge graph. A property for generating a presentation of search results from the ranked list of properties is identified, based at least in part on the search query and on the type of the entity reference. A presentation technique is determined associated with the property for generating a presentation. Search results are caused to be presented based on the presentation technique.

In some implementations, a computer implemented method for providing search results comprises receiving a search query. A modifying concept is identified in the search query. A query tree is generated based on the search query. Search results are retrieved from a knowledge graph, based at least in part on the query tree. At least one ranking property is determined based at least in part on the modifying concept. Search results are ranked based at least in part on the at least one ranking property.

In some implementations, a computer implemented search method for search comprises identifying a modifying concept based on a search query. A rule for ranking search results is determined based at least in part on the modifying concept and on a knowledge graph from which at least one of the search results was obtained. Search results are ranked based at least in part on the rule.

In some implementations, a search system is provided comprising one or more computers configured to perform operations. The search system determines, using one or more processors, an entity reference from a search query. The search system identifies a ranked list of properties associated with the type of the entity reference based on a knowledge graph. The search system identifies a property for generating a presentation of search results from the ranked list of properties, based at least in part on the search query and on the entity type. The search system determines a presentation technique associated with the property for generating a presentation. The search system causes to be presented search results based on the presentation technique.

In some implementations, a search system is provided comprising one or more computers configured to perform operations. The search system receives a search query. The search system identifies a modifying concept in the search query. The search system generates a query tree based on the search query. The search system retrieves search results from a knowledge graph, based at least in part on the query tree. The search system determines at least one ranking property based at least in part on the modifying concept. The search system ranks search results based at least in part on the at least one ranking property.

In some implementations, a search system is provided comprising one or more computers configured to perform operations. The search system identifies a modifying concept based on a search query. The search system determines a rule for ranking search results based at least in part on the modifying concept and on a knowledge graph from which at least one of the search results was obtained. The search system ranks search results based at least in part on the rule.

In some implementations, a non-transitory computer-readable medium for using in providing search results is provided. The computer-readable medium has instructions for determining an entity reference from a search query. The computer-readable medium has instructions for identifying a ranked list of properties associated with a type of the entity reference based on a knowledge graph. The computer-readable medium has instructions for identifying a property for generating a presentation of search results from the ranked list of properties, based at least in part on the search query and on the type of the entity reference. The computer-readable medium has instructions for determining a presentation technique associated with the property for generating presentation. The computer-readable medium has instructions for causing to be presented search results based on the presentation technique In some implementations, a non-transitory computer-readable medium for using in providing search results is provided. The computer-readable medium has instructions for receiving a search query. The computer-readable medium has instructions for identifying a modifying concept in the search query. The computer-readable medium has instructions for generating a query tree based on the search query. The computer-readable medium has instructions for retrieving search results from a knowledge graph, based at least in part on the query tree. The computer-readable medium has instructions for determining at least one ranking property based at least in part on the modifying concept. The computer-readable medium has instructions for ranking search results based at least in part on the at least one ranking property.

In some implementations, a non-transitory computer-readable medium for search is provided. The computer-readable medium has instructions for identifying a modifying concept based on a search query. The computer-readable medium has instructions for determining a rule for ranking search results based at least in part on the modifying concept and on a knowledge graph from which at least one of the search results was obtained. The computer-readable medium has instructions for ranking search results based at least in part on the rule.

BRIEF DESCRIPTION OF THE FIGURES

FIG. 11 shows a flow diagram including illustrative steps for determining a search presentation technique in accordance with some implementations of the present disclosure;

FIG. 18 shows a diagram including illustrative modifying concepts in accordance with some implementations of the present disclosure;

FIG. 19 shows a flow diagram including illustrative steps for determining a rule for ranking search results in accordance with some implementations of the present disclosure;

DETAILED DESCRIPTION OF THE FIGURES

In some implementations, a search system retrieves a collection of search results based on a search query received from a user. In an example, an internet search engine retrieves a set of links to webpages based on a search query. In some implementations, it may be desired to present search results using a technique that reflects the content of the search query, the content of the search results, or both. For example, it may be useful for the search system to present search results that include geographic locations on a map, and to present search results that include chronological dates on a timeline. For example, a search results for the search query "Cities in California" may automatically be presented on a map, while search results for the search query "Paintings by Van Gogh" may be presented in an image gallery view. In some implementations, the search system may rely in part on a data stored in a data structure to determine search results, rank the search results, and generate a presentation. Specific examples of several presentation techniques are shown below in FIGS. 2-6.

The following description and accompanying FIGS. 1-21 provide additional details and features of some implementations of the search system.

Figure 1:
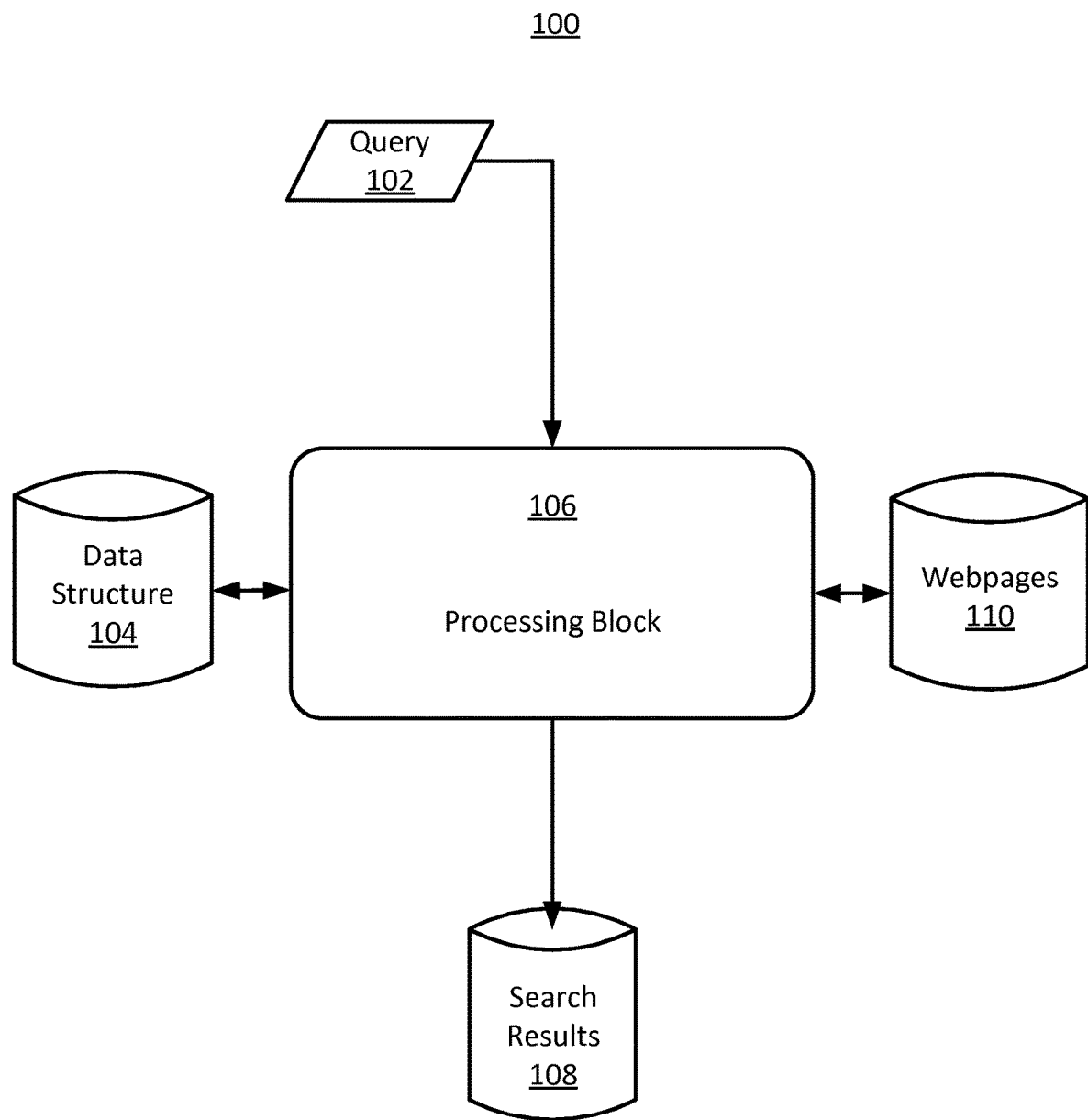
FIG. 1 shows an information flow diagram in accordance with some implementations of the present disclosure.

FIG. 1 shows an information flow diagram in accordance with some implementations of the present disclosure. In some implementations, the search system receives a search query in search query block 102, determines sorting properties and presentation techniques in processing block 106 based in part on information in data structure block 104 and webpages block 110, and outputs search results to search results block 108.

In some implementations, search query block 102 receives input related to a search query. In an example, the search system may receive a text search query in a text box. In some implementations, search queries include text, images, audio, any other suitable content, or any combination thereof. In some implementations, search queries may be directed towards a search of the internet for webpages, a search of a database for a specific piece of information, a map search, a video search, an image search, a timeline search, any other suitable search, or any combination thereof.

Data structure block 104 includes a data structure including piece of information defined in part by the relationships between them. In some implementations, data structure block 104 includes any suitable data structure, data graph, database, index, list, linked list, table, any other suitable information, or any combination thereof. In an example, data structure block 104 includes a collection of data stored as nodes and edges in a graph structure. In some implementations, data structure block 104 includes a knowledge graph. In some implementations, a knowledge graph includes data organized in a graph containing nodes and edges. The data of a knowledge graph may include states about relationships between things and concepts, and those statements may be represented as nodes and edges of a graph. The nodes of a knowledge graph each contain a piece or pieces of data and the edges represent relationships between the data contained in the nodes that the edges connect. A particular implementation of a knowledge graph, is described below in FIGS. 8-10.

Webpages block 110 includes information from the internet. In some implementations, webpages block 110 include webpages, hyperlinks, text, images, audio, video, and other suitable content on the internet. In some implementations, webpages block 110 includes indexed or organized data that is retrieved from the internet. In an example, webpages organized data includes rankings of webpages based on the number of hyperlinks to and from that webpage.

In some implementations, processing block 106 performs processing steps to rank search results and generate a presentation. In some implementations, ranking search results includes processing block 106 identifying a modifier or a modifying concept in the search query received from search query block 102. In an example, the modifier is a superlative such as "Best" or "Tallest" in the search query. Modifying concepts may be explicit, such that the modifying word appears in the search query, or may be implicit, such that the modifying word does not appear, but is implicitly defined by other elements of the search query.

In some implementations, processing block generates a query tree based on the search query received from search query block 102 and data stored in data structure block 104 and/or webpages block 110. In some implementations, a query tree is a structured arrangement of search query terms and other elements. Generating a query tree is described in detail below. In some implementations, processing block 106 retrieves search results from data structure block 104 and/or webpages block 110 using the generated query tree. In an example, where data structure block 104 includes a collection of entity references, search results may include entity references related to the terms or elements of the query tree. In some implementations, a collection of entity references includes collections of data, pictures, videos, text, references to other data, links to webpages, any other suitable content, or any combination thereof. In some implementations, processing block 106 determines a sorting property based on the identified modifier. In an example, where the modifying property is "Tallest," the sorting property may be property "Height."

In some implementations, generating a presentation includes processing block 106 determining an entity reference from a search query. As used herein, an entity is a thing or concept that is singular, unique, well-defined, and distinguishable. For example, an entity may be a person, place, item, idea, topic, abstract concept, concrete element, other suitable thing, or any combination thereof. In some implementations, search results include results identifying entity references. As used herein, an entity reference is an identifier, e.g., text, or other information that refers to an entity. For example, an entity may be the physical embodiment of George Washington, while an entity reference is an abstract concept that refers to George Washington. Where appropriate, based on context, it will be understood that the term entity as used herein may correspond to an entity reference, and the term entity reference as used herein may correspond to an entity.

The processing block identifies a ranked list of properties associated with the identified entity reference. In some implementations, the search system retrieves the ranked list from data structure block 104. In some implementations, ranked lists are preprocessed and stored in data structure block 104 or other suitable location, processed at the time of search, or any combination thereof. In some implementations, the search system identifies a property for presentation based on the ranked list and generates a presentation based on the property. In some implementations, the presentation is output to search results block 108.

In some implementations, ranked search results, presentation techniques, or both, are output to ranked search results block 108. In some implementations, search results include, for example, entities from data structure 104, other data from data structure 104, a link to a web page, a brief description of the target of the link, contextual information related to the search result, an image related to the search result, video related to the search result, any other suitable information, or any combination thereof. In some implementations, the search system ranks the search results retrieved in processing block 106 using the sorting property identified in processing block 106. In an example, where search query block 102 includes the search query "Tallest Building," the search system may retrieve a collection of buildings from data structure block 104 and/or webpages block 110, determine that the sorting property is "Height," and may output a ranked list of buildings by height to ranked search results block 108. In some implementations, the search system uses the presentation generated in processing block 106. In an example, the search system determines in processing block 106 that search results should be presented in a timeline. It will be understood that the ranking and/or the presentation may be used to present search results. In an example, the search system may only present the top 10 ranked search results in a map presentation. In another example, the search system may order a list of search results links based on the ranking. In another example, the search system may generate a voice narration of search results.

The following description and accompanying FIGS. 2-6 show examples of user interfaces that the search system may use to provide search results. In some implementations, search results block 108 of FIG. 1 provides search results using a presentation technique illustrated in FIGS. 2-6. In some implementations, presentation techniques may include visual techniques, audio techniques, any other suitable techniques, or any combination thereof. In some implementations, the search system may use information from data structure block 104 to select, generate, and provide search results in a particular presentation. In some implementations, the information used to generate a presentation is retrieved from data structure block 104 and webpages block 110 as part of the search results, in addition to search results, or any combination thereof. In an example, the search system may determine based on data stored in data structure block 104 that is associated with the search results that the best presentation technique is to show locations on a map. In another example, the search results may include information from data structure block 104 such as a list of sizes, ages, or comparative information. In the example, the search system may present those results on a timeline or chart. In some implementations, data structure block 104 includes information associating particular pieces of information with particular presentation techniques. In some implementations, the search system retrieves from data structure block 104 both the search results and the information relating to presentation techniques.

In some implementations, the search system may automatically determine a best or otherwise desirable presentation technique. In some implementations, the search system uses the search query to determine a presentation technique. Techniques for generating a presentation technique are discussed below in flow diagram 1100 of FIG. 11. In an example, "U.S. Presidents After 1950" is presented in a timeline while "U.S. Presidents With Black Hair" is presented in an image gallery. In some implementations, the search system identifies "1950" as relating to a year, and identifies a timeline as the best way to show years. Similarly, in some implementations the search system identifies "Black" as a color, and identifies an image gallery as the best way to show colors. In this way, the presentation technique is implicitly included in the search query. In another example, the presentation technique is explicitly stated in the received search query, such as "U.S. Presidents In A Timeline" or "Largest US Cities On A Map." In some implementations, the search system receives user input indicating a desired presentation technique. In some implementations, the search system uses an automatically determined technique, and then replaces that with a user selected technique following user input.

Figure 2:
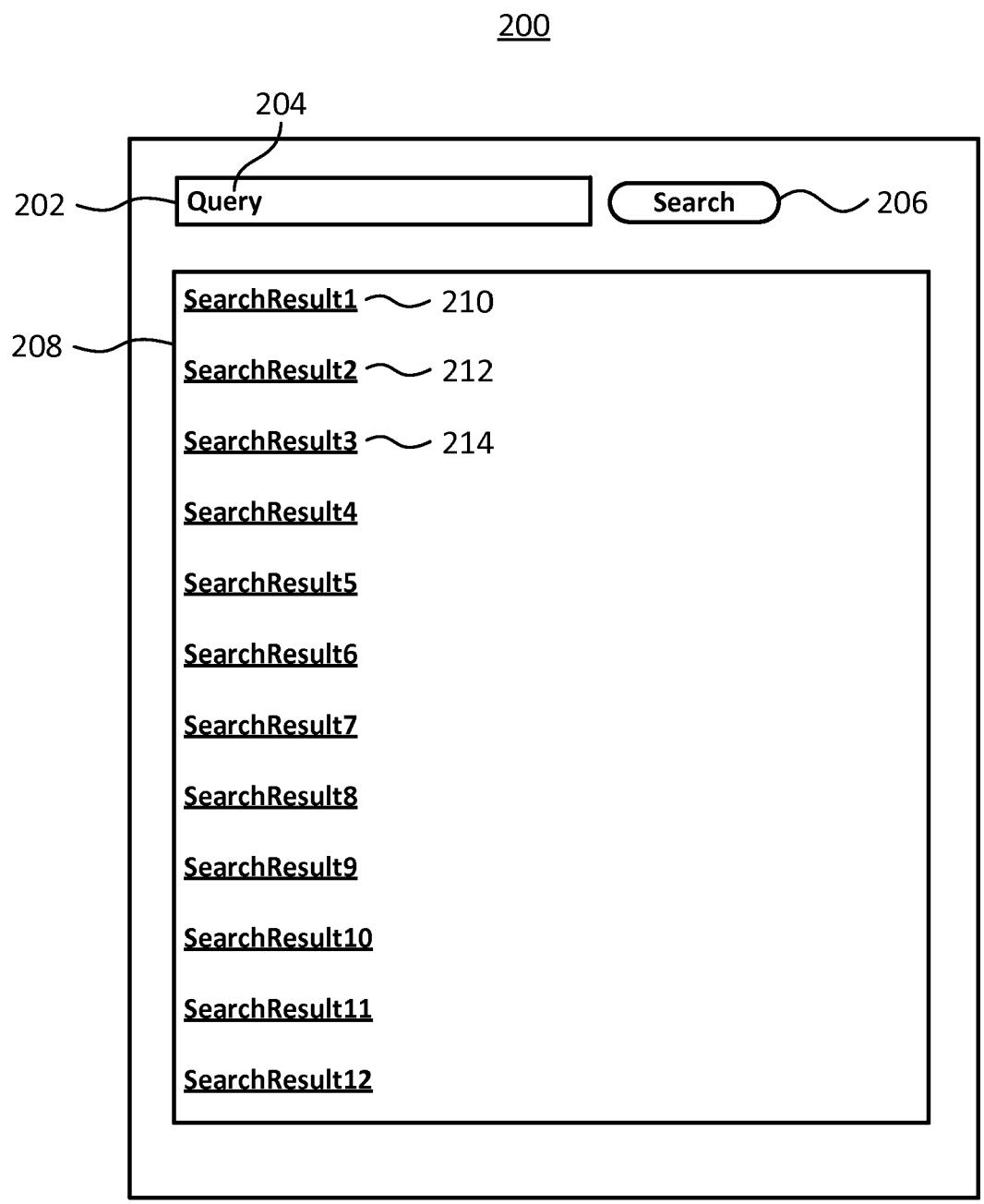
FIG. 2 shows an example of a list user interface in accordance with some implementations of the present disclosure.

FIG. 2 shows example list user interface 200 in accordance with some implementations of the present disclosure. In some implementations, user interface 200 illustrates a list of search results links. In some implementations, user interface 200 includes search query box 202 containing received search query "Query" 204. In some implementations, the search query is received using textual input, voice command, image drag-and-drop, gesture recognition, camera input, any other suitable technique, or any combination thereof. In some implementations, the search query is textual, image-based, audio-based, video-based, of any other suitable format, or any combination thereof. In some implementations, search button 206 receives user input indicating a desired search. The search button may be activated, for example, using input received using a mouse or touchpad. In some implementations, activation of the search button causes search results to be presented.

In some implementations, search results area 208 includes the search results related to search query "Query" 204. Search results area 208 may include, for example "SearchResult1" 210, "SearchResult2" 212, and "SearchResult3" 214. In some implementations, search results include, for example, a link to a web page, a brief description of the target of the link, contextual information related to the search result, an image related to the search result, video related to the search result, any other suitable information, or any combination thereof. In some implementations, contextual information includes a time stamp, a date stamp, historical information, a link to cached versions of content, a link to related content, a link to social medial content, an indicator of the relevance of a search result, any other suitable contextual information, or any combination thereof. In some implementations, contextual information includes data from data structure block 104 of FIG. 1 that is used to rank search results. For example, where search query "Query" 204 is "Largest Cities in the US," search results may include cities, and contextual information may include the populations and/or areas of the cities. In some implementations, search results area 208 includes other elements not shown, such as a scroll bar, next page links, statistical information, contextual information, other suitable content, or any combination thereof.

In some implementations, the order of search results "SearchResult1" 210, "SearchResult2" 212, and "SearchResult3" 214 is based a ranking determined in processing block 106 of FIG. 1, is based on flow diagram 1100 of FIG. 11, below, is based on any other suitable technique, or any combination thereof. It will be understood that the presentation of search results in user interface 200 is merely an example and that any suitable presentation of any suitable results may be used.

Figure 3:
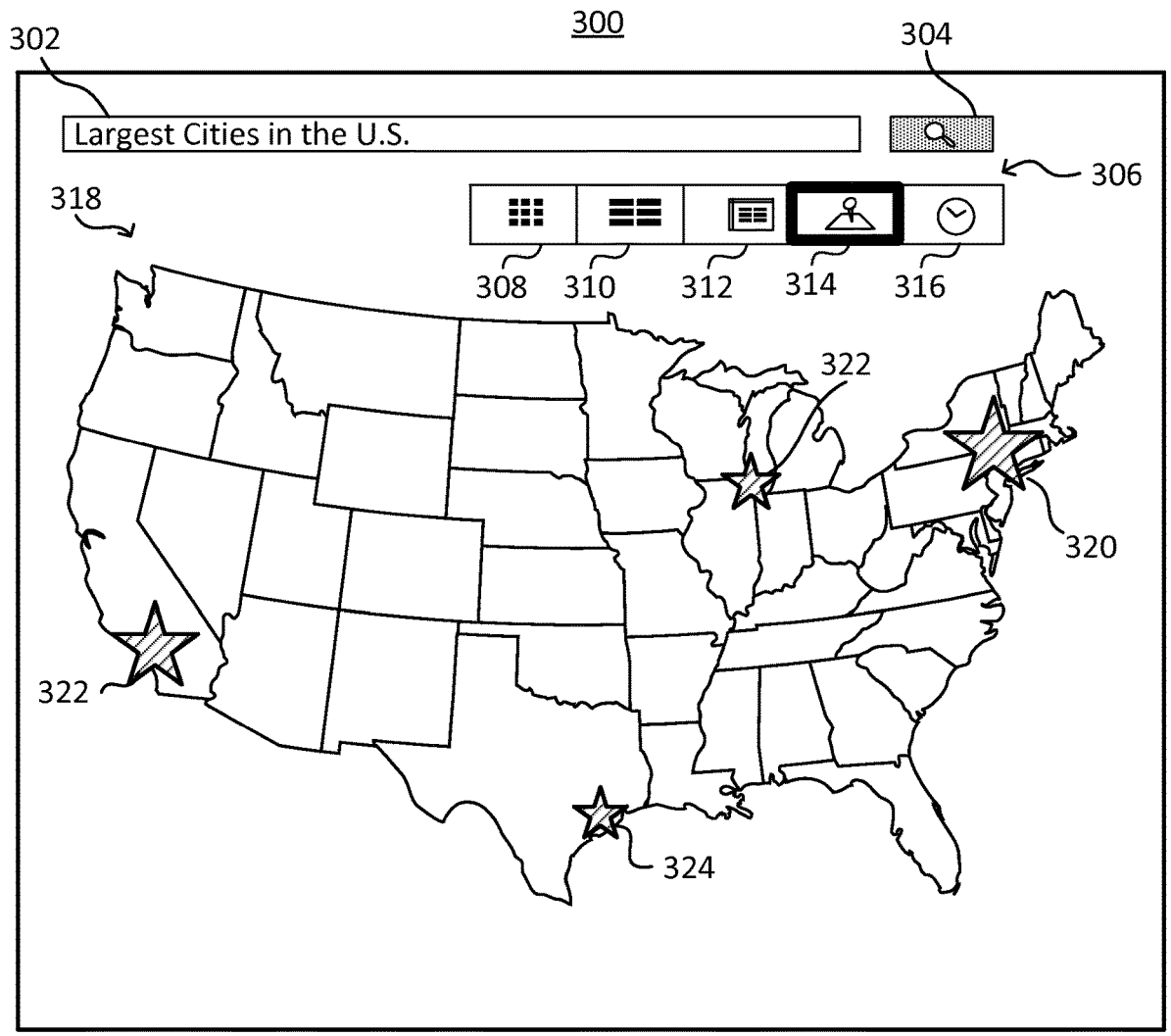
FIG. 3 shows an example of a map user interface in accordance with some implementations of the present disclosure.

FIG. 3 shows example map user interface 300 in accordance with some implementations of the present disclosure. User interface 300 shows a map presentation of search results. In some implementations, the search system presents search results based in part on geographic location. In the illustrated example, a search for "Largest Cities in the U.S." presents the four largest cities as stars on a map.

User interface 300 includes search box 302. In some implementations, the search system receives a search query in search query box 302. In some implementations, search results are received as described for search query box 204 of FIG. 2. User interface 300, search button 304 receives input as described for search button 206 of FIG. 2.

In some implementations, presentation selector 306 presents elements related to several presentation techniques. In some implementations, elements include icons, text, images, animations, any other suitable element, or any combination thereof. In an example, presentation selector 306 includes a gallery view link 308, list view link 310, chart view link 312, map view link 314, and timeline view link 316. In some implementations, the presently used presentation technique is indicated. For example, the indication may include bold outlining, as illustrated, highlighting, enlarging, moving, resizing, any other suitable indication, or any combination thereof. In some implementations, the search system automatically selects a presentation technique, and receives input from the user in presentation selector 306 when the user desires a different presentation technique. In some implementations, user input is received using a mouse, touchpad, keyboard, any other suitable input device, or any combination thereof. In some implementations, hovering or other uncommitted input with a mouse or other input device over an element of presentation selector 306 causes the search system to present a preview or to temporarily present search results with a particular presentation technique. In some implementations, committing to a selection includes receiving a mouse click, a first or second touchscreen selection, any other suitable input, or any combination thereof.

In some implementations, map presentation 318 includes an image of a geographical region. In some implementations, the search system determines the geographical region presented based on the search query, the search result, user preferences, user history, global search history, predetermined parameters, any other suitable parameters, or any combination thereof. In the illustrated example, where the search query is "Largest Cities in the U.S.," the search system may interpret the term "U.S." to indicate the region including the country United States of America and present a map of that region. In this example, the geographic region is explicitly included in the received search query. In another example, the search system may receive a search query "Georgia" and present a presentation including either Georgia, USA or the Eurasian country Georgia based on the user's preferences, the user's location, other elements of the search query, other elements of the search results, global popularity, any other suitable parameters, or any combination thereof. For example, the search system may use a global popularity index to select between the Paris, Texas and Paris, France, since Paris, France receives a much higher frequency of searches. Where popularity is less clearly distinguished, for example, Jupiter the planet and Jupiter the Roman god, other parameters may be used.

In the illustrated example, where the search query is "Largest Cities in the U.S.," the first four search results may be New York, New York; Los Angeles, California; Chicago, Illinois; and Houston, Texas. The search results are presented in map presentation 318 as stars at the locations of those cities. In some implementations, locations associated with search results are indicated using: icons, e.g., circles, stars, arrows, squares; images; text titles; text descriptions; any other suitable indication; or any combination thereof. In the example, the search system interpreted the search query "Largest Cities" to relate to the largest population. In the illustrated example, the population is indicated by the size of the search result indicator, thus larger populations are indicated by larger stars. The search query may also be interpreted as, for example, to indicate a search for the largest area or largest population in the metropolitan area. In some implementations, the search system selects between these interpretations of a query based on global search popularity, user preferences, user input, the search query, search results, any other suitable content, or any combination thereof.

It will be understood that the elements of map presentation 318 in user interface 300 are merely an example and that the search system may add, remove, reconfigure, alter, combine, otherwise change any suitable elements by any suitable technique, or any combination thereof. For example, in some implementations the search system presents any suitable number of search results. In another example, in some implementations the search system presents a map without state borders, a map with the names of the states, a map with roads displayed, a map with bordering states, any other suitable map, or any combination thereof. In some implementations, the map may be resized, repositioned, zoomed, scaled, explored, recolored, reconfigured by any other suitable technique, or any combination thereof.

Figure 4A:
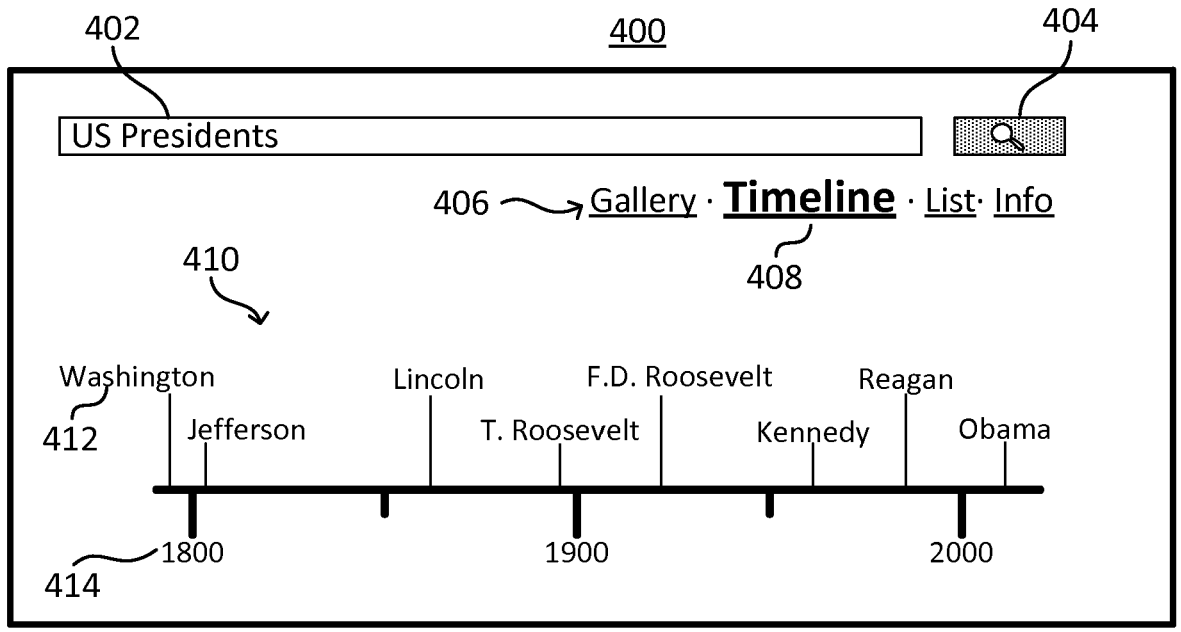
FIG. 4A shows an example of a timeline user interface in accordance with some implementations of the present disclosure.

FIG. 4A shows example timeline user interface 400 in accordance with some implementations of the present disclosure. In some implementations, user interface 400 includes a timeline presentation of search results. In some implementations, user interface 400 includes search query box 402 and search button 404. In some implementations, search query box 402 is configured as described for search query box 202 of FIG. 2. In some implementations, search button 404 is configured as described for search button 206 of FIG. 2.

In the illustrated example, the received search query is "U.S. Presidents." In some implementations, the search system may interpret this search query as seeking a collection of people that have served as President of the United States of America. In some implementations, the search system may identify an entity type associated with the entity reference. The entity type may be a categorization or classification used to identify entity references in the data structure. For example, the entity reference "George Washington" may be associated with the entity types "U.S. President," "Person," and "Military Officer." Entity references may be associated with more than one entity type. In an example, the search system may identify an entity reference in the search query such as "President" which is associated with the entity type "Political Office Holder." In some implementations, the search system identifies a list of properties associated with the entity type. For example, the entity type "Political Office Holder" may be associated with the properties "Years In Office," "Year Inaugurated," "Political Position," "Name," "Age When Elected," "Image," any other suitable properties, or any combination thereof. In some implementations, a particular entity reference, e.g. "George Washington," has a value stored in a data structure for some or all of the properties. In an example, the entity reference "George Washington" is associated with the property "Year Inaugurated" having the value "1789" and with the property "Name" having the value "George Washington." In some implementations, values may include text, images, video, audio, links, any other suitable content, or any combination thereof.

In some implementations, presentation selector 406 includes text links to additional presentation techniques. In an example, the search system presents search results in a presentation technique based on the received search query, and then may receive user input indicating a desired reconfiguration of a presentation. In the illustrated example, the search system initially determines to present search results related to "U.S. Presidents" on a timeline based on the property "Year Inaugurated." The user of the timeline presentation is indicated by the bold, enlarged "Timeline" indicator 408 in presentation selector 406. In some implementations, presentation selector 406 includes elements such as icons, text, images, animations, any other suitable element, or any combination thereof. In some implementations, the presently used presentation technique is indicated using, for example, boldfaced type, as illustrated, highlighting, enlarging, moving, resizing, any other suitable indication, or any combination thereof. In some implementations, presentation selector 406 is configured as described for presentation selector 306 of FIG. 3.

In some implementations, timeline presentation 410 includes a series of events, entity references, or other topics, arranged in part according to an associated date or time. In the illustrated example of user interface 400, U.S. Presidents are arranged according to the date of their inauguration. In some implementations, topics on the timeline include lines, shapes, icons, images, text, descriptions, any other suitable content, or any combination thereof. In an example, topic "George Washington" 412 is presented on the timeline and is connected to the timeline by a vertical line. Topic "George Washington" 412 may also include the date of his inauguration, an image, any other suitable information, or any combination thereof. In some implementations, topic "George Washington" 412 is a link where the search system receives user input indicating a selection of that topic. For example, the search system may receive a mouse click of topic "George Washington" 412 and in response present information related to "George Washington," a webpage, search results, any other suitable content, or any combination thereof.

In some implementations, the timeline includes time and/or date indicators such as date "1800" 414. It will be understood that the timeline may be presented horizontally, vertically, in a grid, in a calendar format, in a non-linear arrangement, in any other suitable configuration, or any combination thereof. In an example, a timeline is presented vertically and detailed descriptions, links, and other suitable content associated with the presented topics are presented to the side of the timeline. In some implementations, presented content is updated based on user input. In an example, the presented content is updated based the search system receiving a pointing gesture with a mouse, and updated again after receiving a click or other gesture.

In some implementations, the search system presents a particular selection of search results. For example, timeline presentation 410 presents a selection of U.S. Presidents between 1789 and 2012. In some implementations, the selection of presented elements includes data stored in a data structure, global popularity, co-occurrence of topics in web results, user history, user preferences, any other suitable parameters, or any combination thereof. In some implementations, the presentation may be zoomed, resized, changed, reconfigured by any other suitable technique, or any combination thereof. In some implementations, reconfiguring the presentation causes the search system to present a different set and/or number of search results. In an example, reconfiguring the presentation to show only the timeline between the years 1900 and 1950 may cause more topics meeting that year range to be presented in timeline presentation 410. In some implementations, the number of presented topics is based on the size of the display screen, the search results, the search topic, user preferences, global search history, predetermined parameters, any other suitable parameters, or any combination thereof. In an example, if the topic titles are relatively long, less of them may be presented. In another example, more topics may be presented at once on a relatively large-screeened laptop monitor than on a relatively small-screened smartphone. In another example, amount of displayed text may depend on a user or automatically selected display font size. In another example, the search system may have a predetermined maximum number of topics it can present.

In some implementations, filters or facet links are presented to narrow search results, though not shown in FIG. 4A. For example, a set of links may be presented in user interface 400 to "U.S. Presidents 1800-1900," "U.S. Presidents 1900-1950," "U.S. Presidents 1950-2000," "Democratic Presidents," "Republican Presidents," any other suitable filters, or any combination thereof. In some implementations, filters are grouped into categories. In an example, filters may be grouped for the search query "U.S. Presidents" into "Year," "Political Party," and "Age."

Figure 4B:
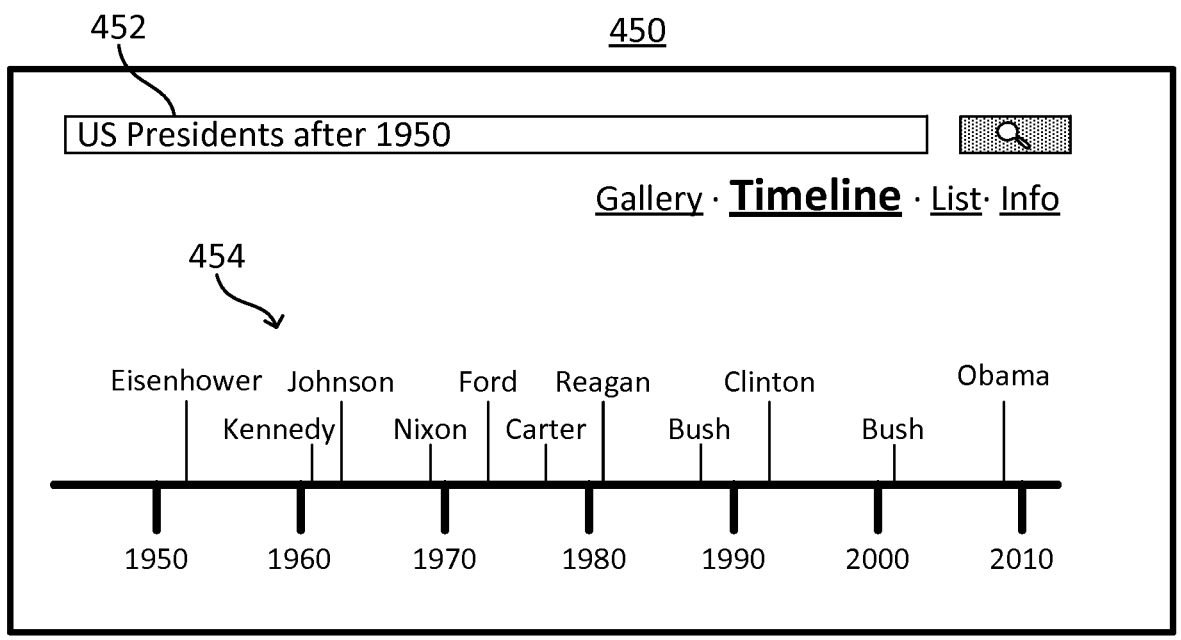
FIG. 4B shows another timeline example user interface in accordance with some implementations of the present disclosure.

FIG. 4B shows example timeline user interface 450 in accordance with some implementations of the present disclosure. In some implementations, the search system receives a search query that includes a filter or limitation. In the illustrated example, the search query "U.S. Presidents After 1950" is received in search query box 452. The search system may interpret this as a search for presidents of the United States of America who were inaugurated between the year 1950 and the present.

Timeline 454 includes dates from 1950 to 2010 and all of the U.S. Presidents from those years. In some implementations, all search results are presented. In some implementations, such as the user interface 400 of FIG. 4A, a selection of search results is presented. In some implementations, as above, the number of presented search results depends on the number of search results, the search query, the presentation technique, the display screen, any other suitable parameter, or any combination thereof. In some implementations, all search results are presented. In an example, the presidents are indicated by lines associated with the date of their inauguration. In another example, the Presidents may be indicated with bars showing the range years they held office. It will be understood that any suitable technique for presenting content in a timeline or any other presentation technique may be used.

In some implementations, user interface 450 of FIG. 4B is presented after receiving a refinement or other suitable user input to user interface 400 of FIG. 4A. In an example, the system may present user interface 400 of FIG. 4A after receiving a search query for U.S. Presidents, and may present user interface 450 of FIG. 4B after receiving user input indicating a desire to see only presidents following the year 1950. The input may include selection of a filter or category link, inputting additional terms into search box 402 of FIG. 4A, zooming or scrolling timeline 410 of FIG. 4A, any other suitable input, or any combination thereof. In some implementations where user input does not include inputting additional terms into search box 402 of FIG. 4A, the search system may automatically update the terms presented in search box 452 of FIG. 4B to reflect the updated search query.

Figure 5:
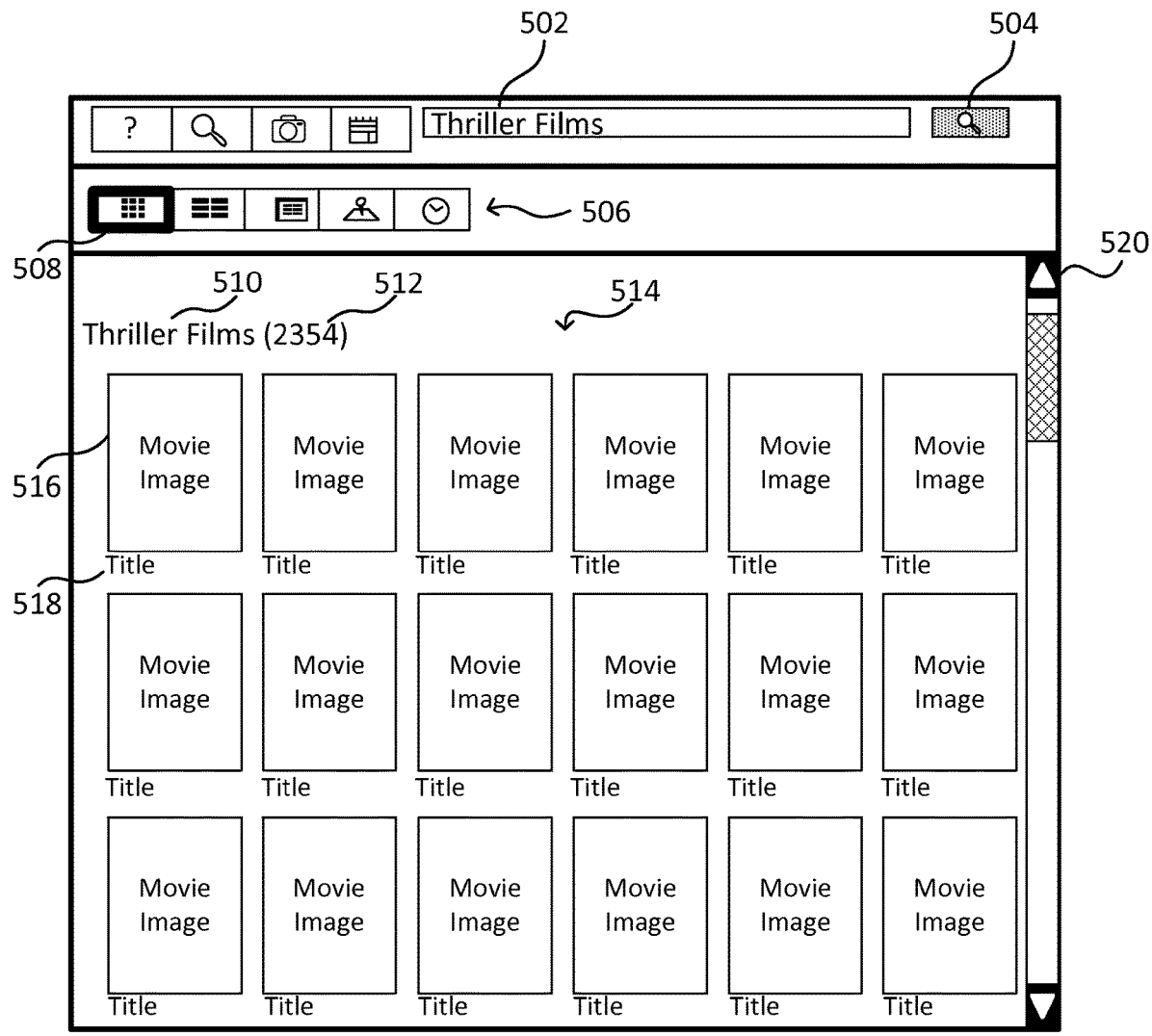
FIG. 5 shows an example of a gallery user interface in accordance with some implementations of the present disclosure.

FIG. 5 shows example gallery user interface 500 in accordance with some implementations of the present disclosure. In some implementations, user interface 500 includes a gallery presentation of search results. In some implementations, user interface 500 includes search query box 502 and search button 504. In some implementations, search query box is configured as described for search query box 202 of FIG. 2. In some implementations, search button 504 is configured as described for search button 206 of FIG. 2. In the illustrated example, the received search query is "Thriller Films." In some implementations, the search system interprets this search query as seeking a collection of films and movies of the thriller genre. In the example, the search system identifies the search topic "Films" and determines that the most useful presentation property of that topic is an image of the movie poster. In some implementations, search results and associated properties are retrieved from a data structure such as data structure block 104 of FIG. 1 and/or webpages block 110 of FIG. 1. In some implementations, the data structure contains information that a particular technique of presentation is associated with the property "Movie Poster." Further, each particular movie may have an image as the value associated with the property "Movie Poster," and that image or a link to the image is stored in the data structure. The search system may present these images as search results in user interface 500.

In some implementations, presentation selector 506 presents elements as described for presentation selector 306 of FIG. 3. In an example, presentation selector 506 includes gallery view link 508. In the illustrated example, the presently used presentation technique is indicated by a bold outline.

In some implementations, collection title 510 is presented. In some implementations, collection title 510 is the same as the search query. In some implementations, for example where the search query is more complex, collection title 510 may be different. In some implementations, collection title 510 relates to an entity type stored in a data structure such as data structure block 104 of FIG. 1. In the illustrated example, the search system presents collection title 510 as "Thriller Films" in response to the search query "Cinema Of The Genre Thriller." In another example, the search system presents collection title 510 as "U.S. Presidents" in response to receiving the search query "U.S. Presidential Pictures."

In some implementations, search result count 512 is presented. In some implementations, search result count 512 indicates the number of search results. Presenting this data may be desired when, for example, a user is trying to refine a search query to result in a particular number of search results.

In some implementations, gallery presentation 514 of user interface 500 includes a grid or matrix of search results. In an example, image 516 and title 518 correspond to an entity reference identified in response to a search query. In some implementations, scroll bar 520 receives input to reconfigure the presented search results. It will be understood that the particular arrangement of gallery presentation 514 is merely an example and that any suitable arrangement may be used. For example, any suitable number of rows and columns of results may be used. In some implementations, image 516 includes an image, video, text, audio, animation, any other suitable content, or any combination thereof. In some implementations, more search results may be presented using scroll bar 520, search results may be paginated such that there is a "Show More Results" or "Page 1, 2,3" link, may be divided and presented by any other suitable technique, or any combination thereof. In some implementations, thumbnail links are presented in a horizontally scrollable display.

Figure 6:
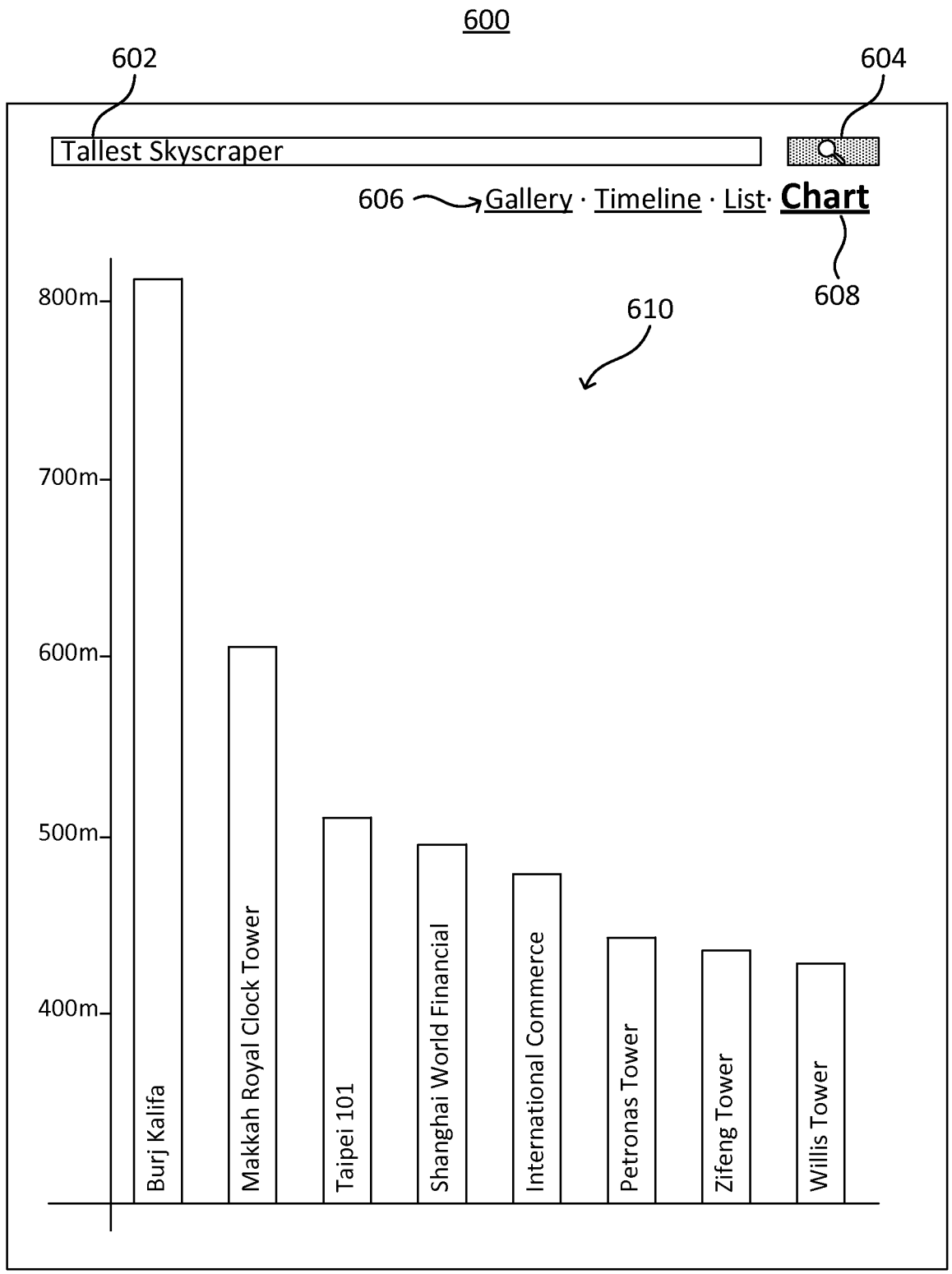
FIG. 6 shows an example of a chart user interface in accordance with some implementations of the present disclosure.

FIG. 6 shows example chart user interface 600 in accordance with some implementations of the present disclosure. In some implementations, user interface 600 includes a chart or information presentation of search results. In some implementations, user interface 600 includes search query box 602 and search button 604. In some implementations, search query box 602 is configured as described for search box 202 of FIG. 2. In some implementations, search button 604 is configured as described for search button 206 of FIG. 2. In the illustrated example, the received search query is "Tallest Skyscraper." In some implementations, the search system may interpret this search query as seeking a collection of the tallest skyscraper buildings in the world. In some implementations, the search system may identify the search topic "Skyscraper" and determine that the most useful presentation property of that topic is height. In some implementations, these properties, and values associated with them, may be stored in a data structure such as a data structure block 104 of FIG. 1. Thus, each particular skyscraper stored in the data structure has a value for the property height associated with it. In some implementations, the search system determines that the best presentation for the height property is a chart presentation such as chart presentation 610.

In some implementations, presentation selector 606 is configured as described for presentation selector 306 of FIG. 3 or presentation selector 406 of FIG. 4

In some implementations, chart view 610 presents information from a search. In the illustrated example where the search is tallest skyscraper, the chart presents the eight tallest skyscrapers along with their height, which is the property that defines them as tallest. In some implementations, presenting this information as a chart rather than a gallery is desired as it highlights the property "Tallest" indicated in the search query. In a contrasting example using user interface 500 of FIG. 5, the search system uses an image gallery presentation technique in response to receiving a search query "Glass And Steel Skyscrapers" or "Brick Skyscrapers," where the visual properties of the search results are included in the search query.

Figure 7:
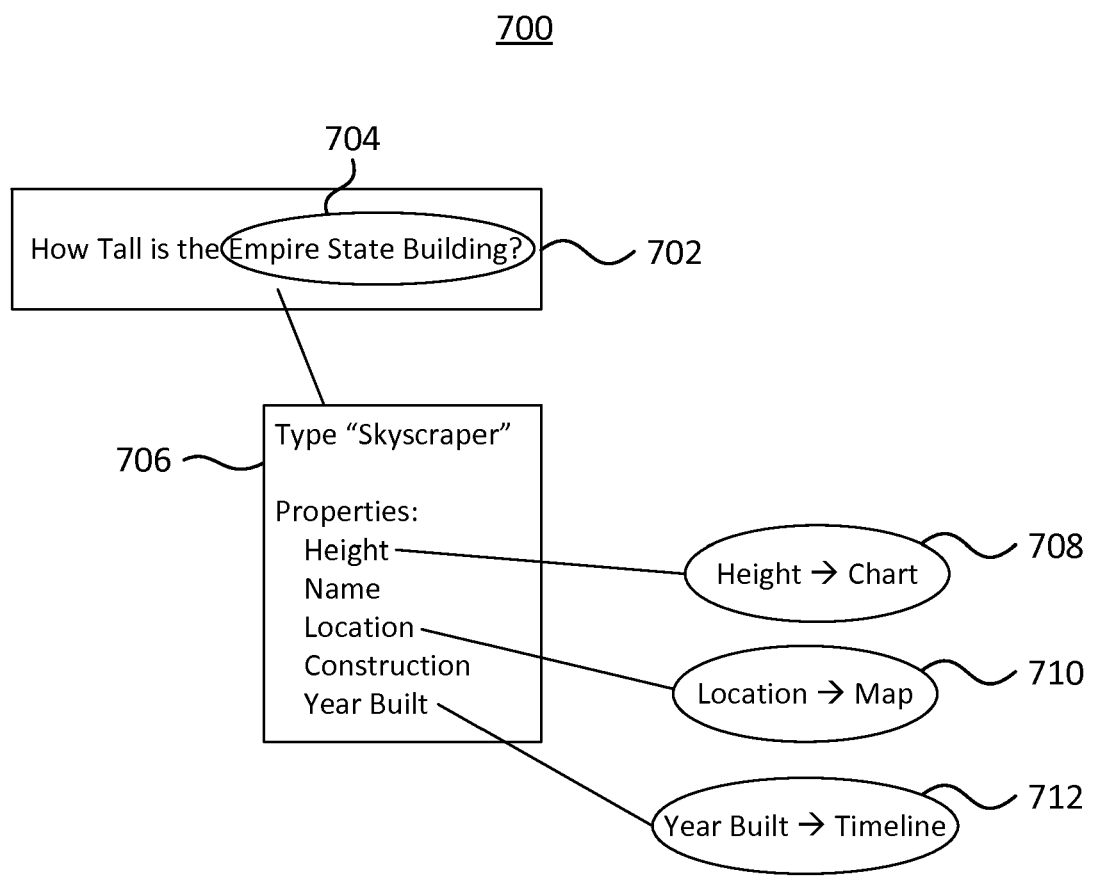
FIG. 7 shows an information diagram for generating a presentation technique in accordance with some implementations of the present disclosure.

FIG. 7 shows information diagram 700 for generating a presentation technique in accordance with some implementations of the present disclosure. In some implementations, information diagram 700 includes information used to select and generate a presentation technique such as the user interfaces shown in FIGS. 2-6 above. In some implementations, the technique described by information diagram 700 is used in the steps described by step 1106 of FIG. 11. In some implementations, information diagram 700 relies on information stored in a data structure such as data structure block 104 of FIG. 1.

Information diagram 700 includes search query 702, ranked list of properties 706, and presentation technique associations 708, 710, and 712. In some implementations, search query 702 includes a received search query. In some implementations, search query 702 includes information related to search query block 102 of FIG. 1. In the illustrated example, the search query "How tall is the Empire State Building" is shown in search query 702. In some implementations, the search system identifies an entity reference in the search query, for example, "Empire State Building," as indicated by entity reference 704. It will be understood that any suitable entity reference or combination of entity references may be identified.

The search system may identify information associated with entity reference 704 in a data structure. In some implementations, the data structure is data structure block 104 of FIG. 1. In some implementations, the search system may identify an entity type associated with the entity reference. An entity type may be referred to as a type of the entity reference. In some implementations, the entity type is a categorization and/or classification used to describe entity references in a data structure. For example, the entity reference "George Washington" may be associated with the entity types "U.S. President," "Person," and "Military Officer." Entity references may be associated with more than one entity type. In the illustrated example, the entity reference "Empire State Building" may be of the entity type "Sky-scraper." In some implementations, entity types may be defined in a data structure. In some implementations, an entity type may be associated with ranked list of properties 706, such that entity references of that entity type are defined by the values of those properties. For example, the entity type "Skyscraper" may be associated with the properties "Height" and "Location," and the entity reference "Empire State Building" may have the property values "1473 feet" and "New York City, NY." In some implementations, the properties may be ordered or ranked. Ranking of the properties for a particular entity type may be based on system designer input, user input, user preferences, global search history, popularity, predetermined parameters, the search query, any other suitable information, or any combination thereof. In some implementations, the ranking is predetermined based on the entity type. In some implementations, the ranking is based on the entity type and the current search query.

In some implementations, the properties of ranked list of properties 706 are associated with particular presentation techniques. For example, the property "Height" is associated with a chart presentation, as illustrated by presentation technique association 708. In another example, the property "Location" is associated with a map presentation, as illustrated by presentation technique association 710. In another example, the property "Year Built" is associated with a timeline presentation, as illustrated by presentation technique association 712.

Figure 8:
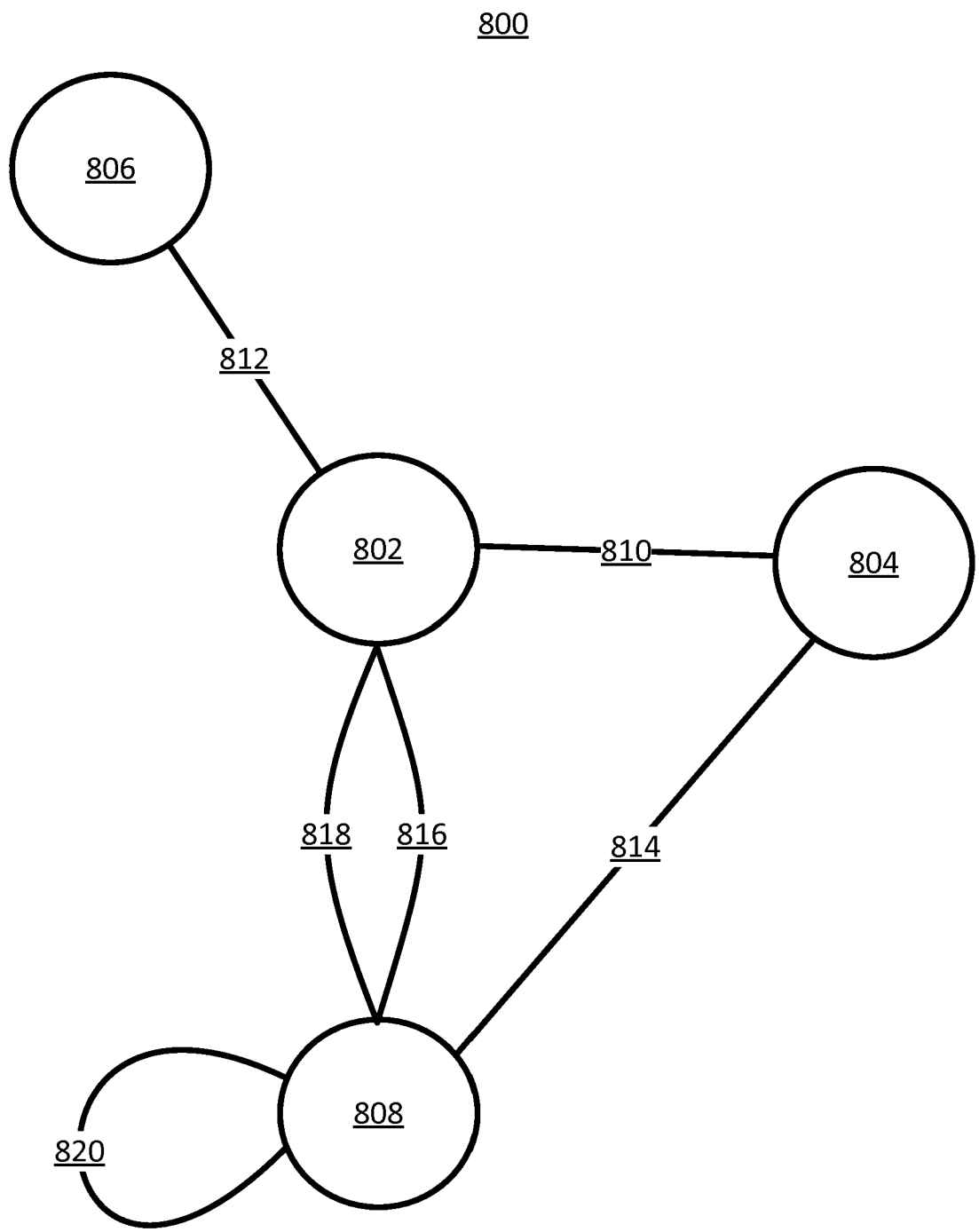
FIG. 8 shows an illustrative knowledge graph portion containing nodes and edges in accordance with some implementations of the present disclosure.
Figure 9:
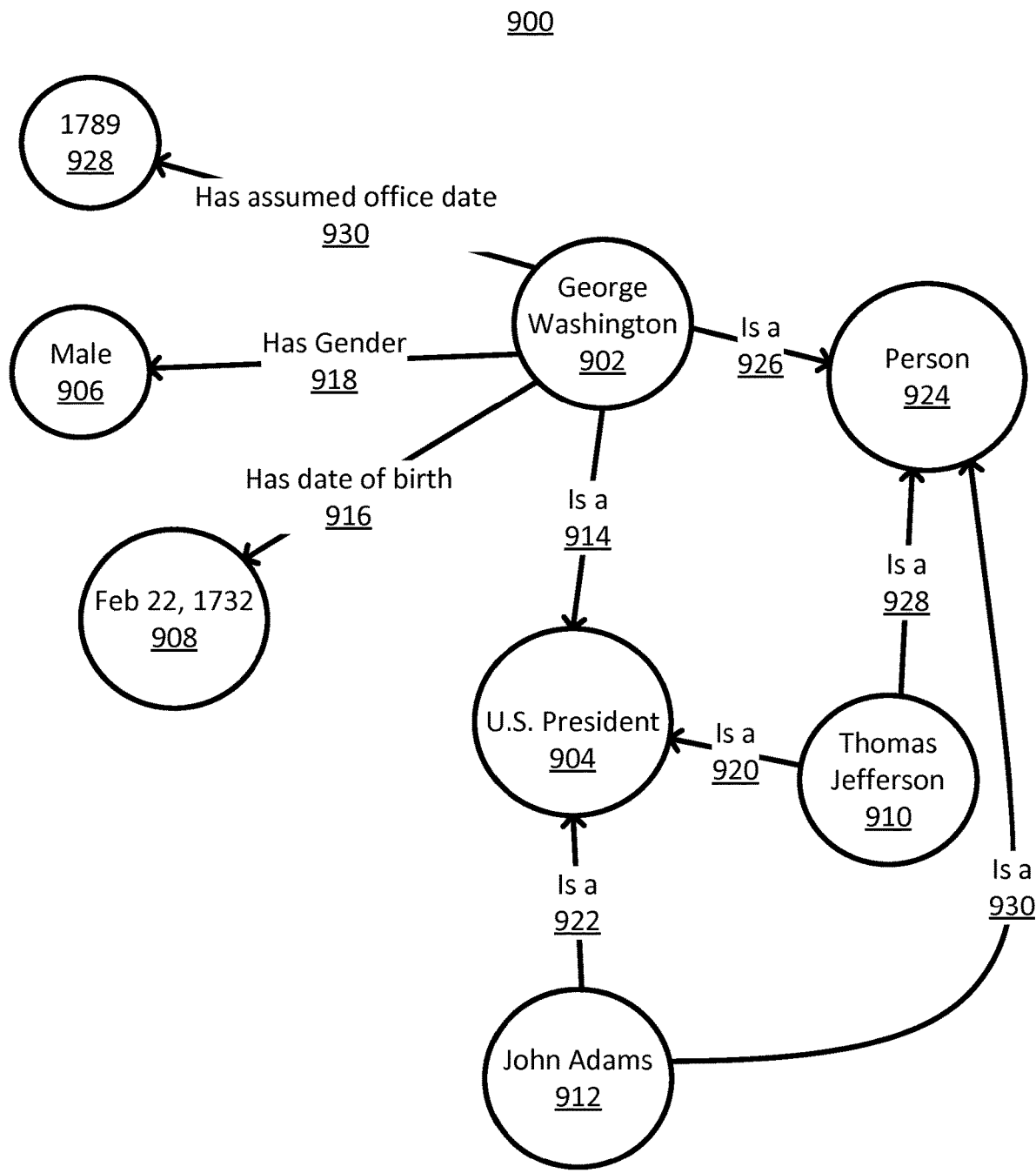
FIG. 9 shows an illustrative knowledge graph portion in accordance with some implementations of the present disclosure.
Figure 10:
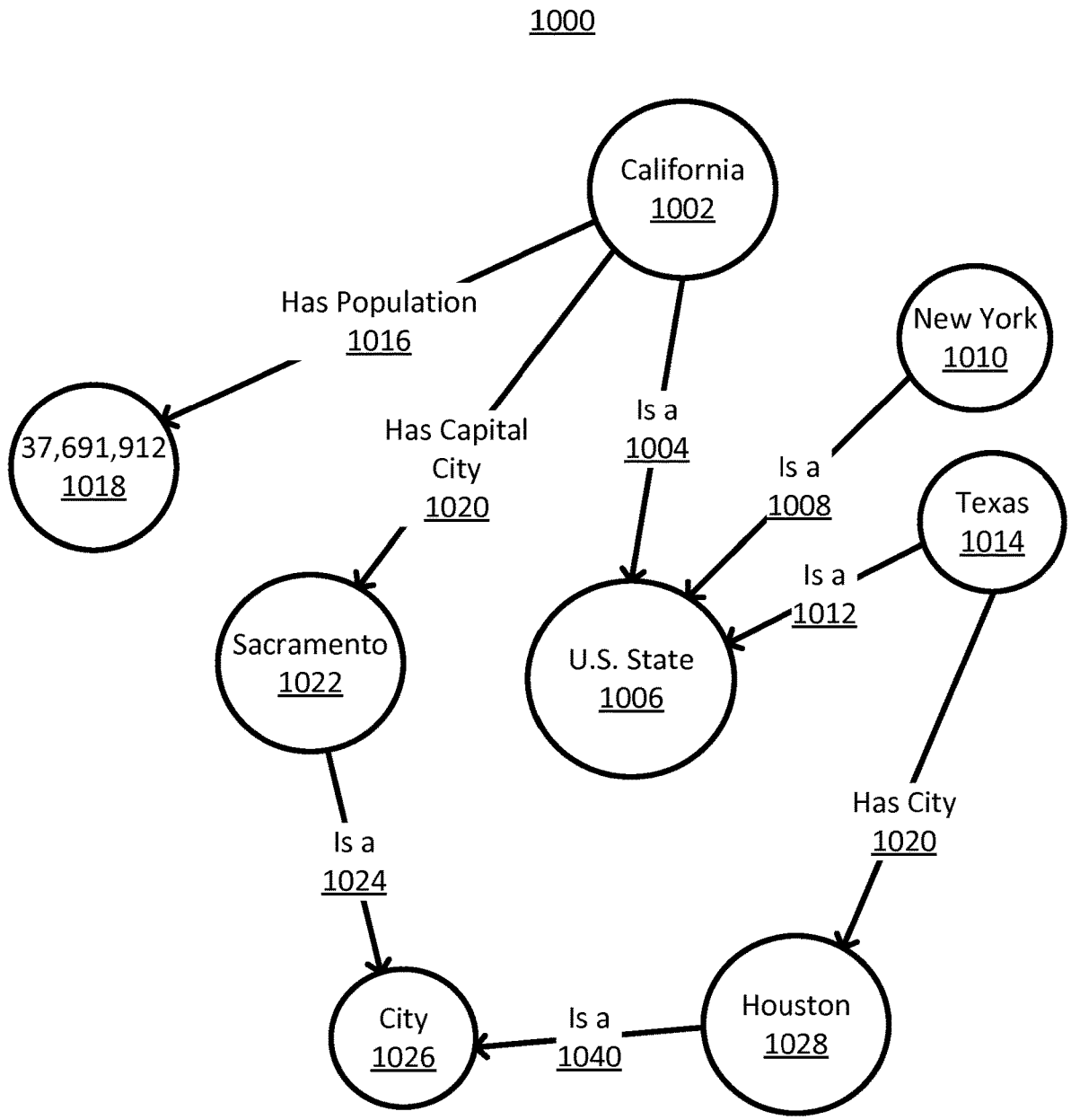
FIG. 10 shows another illustrative knowledge graph portion in accordance with some implementations of the present disclosure.

The following description and accompanying FIGS. 8-10 described an illustrative knowledge graph that may be used with some implementations of the present disclosure. It will be understood that the knowledge graph is merely an example of a data structure that may be used by the search system, and that any suitable data structure may be used.

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. The edge, and thus the graph, may be directed, i.e. unidirectional, undirected, i.e. bidirectional, or both, i.e. one or more edges may be undirected and one or more edges may be directional in the same graph. Nodes may include any suitable data or data representation. Edges may describe any suitable relationships between the data. In some implementations, an edge is labeled or annotated, such that it includes both the connection between the nodes, and descriptive information about that connection. A particular node may be connected by distinct edges to one or more other nodes, or to itself, such that an extended graph is formed. For purposes of clarity, a graph based on the structure described immediately above is referred to herein as a knowledge graph. In some implementations, the knowledge graph may be a useful for representing information and in providing information in search.

FIG. 8 shows illustrative knowledge graph 800 containing nodes and edges. Illustrative knowledge graph 800 includes nodes 802, 804, 806, and 808. Knowledge graph 800 includes edge 810 connecting node 802 and node 804. Knowledge graph 800 includes edge 812 connecting node 802 and node 806. Knowledge graph 800 includes edge 814 connecting node 804 and node 808. Knowledge graph 800 includes edge 816 and edge 818 connecting node 802 and node 808. Knowledge graph 800 includes edge 820 connecting node 808 to itself. Each aforementioned group of an edge and one or two distinct nodes may be referred to as a triple or 3-tuple. As illustrated, node 802 is directly connected by edges to three other nodes, while nodes 804 and 808 are directly connected by edges to two other nodes. Node 806 is connected by an edge to only one other node, and in some implementations, node 806 is referred to as a terminal node. As illustrated, nodes 802 and 808 are connected by two edges, indicating that the relationship between the nodes is defined by more than one property. As illustrated, node 808 is connected by edge 820 to itself, indicating that a node may relate to itself. While illustrative knowledge graph 800 contains edges that are not labeled as directional, it will be understood that each edge may be unidirectional or bidirectional. It will be understood that this example of a graph is merely an example and that any suitable size or arrangement of nodes and edges may be employed.

Generally, nodes in a knowledge graph can be grouped into several categories. Nodes may represent entities, organizational data such as entity types and properties, literal values, and models of relationships between other nodes.

A node of a knowledge graph may represent an entity. An entity is a thing or concept that is singular, unique, well-defined, and distinguishable. For example, an entity may be a person, place, item, idea, abstract concept, concrete element, other suitable thing, or any combination thereof. An entity generally refers to the concept of the entity. It will be understood that in some implementations, the knowledge graph contains an entity reference, and not the physical embodiment of the entity. For example, an entity may be the physical embodiment of George Washington, while an entity reference is an abstract concept that refers to George Washington. In another example, the entity "New York City" refers to the physical city, and the knowledge graph uses a concept of the physical city as represented by, for example, an element in a data structure, the name of the entity, any other suitable element, or any combination thereof. Where appropriate, based on context, it will be understood that the term entity as used herein may correspond to an entity reference, and the term entity reference as used herein may correspond to an entity.

Nodes are unique, in that no two nodes refer to the same thing or concept. Generally, entities include things or concepts represented linguistically by nouns. For example, the color "Blue," the city "San Francisco," and the imaginary animal "Unicorn" may each be entities.

A node representing organizational data may be included in a knowledge graph. These may be referred to herein as entity type nodes. As used herein, an entity type node may refer to a node in a knowledge graph, while an entity type may refer to the concept represented by an entity type node. An entity type may be a defining characteristic of an entity. For example, entity type node Y may be connected to an entity node X by an "Is A" edge or link, discussed further below, such that the graph represents the information "The Entity X Is Type Y." For example, the entity node "George Washington" may be connected to the entity type node "President." An entity node may be connected to multiple entity type nodes, for example, "George Washington" may also be connected to entity type node "Person" and to entity type node "Military Commander." In another example, the entity type node "City" may be connected to entity nodes "New York City" and "San Francisco." In another example, the concept "Tall People," although incompletely defined, i.e., it does not necessarily include a definition of "tall", may exist as an entity type node. In some implementations, the presence of the entity type node "Tall People," and other entity type nodes, may be based on user interaction.

In some implementations, an entity type node may include or be connected to data about: a list of properties associated with that entity type node, the domain to which that entity type node belongs, descriptions, values, any other suitable information, or any combination thereof. A domain refers to a collection of related entity types. For example, the domain "Film" may include, for example, the entity types "Actor," "Director," "Filming Location," "Movie," any other suitable entity type, or any combination thereof. In some implementations, entities are associated with types in more than one domain. For example, the entity node "Benjamin Franklin" may be connected with the entity type node "Politician" in the domain "Government" as well as the entity type node "Inventor" in the domain "Business".

In some implementations, properties associated with entity nodes or entity type nodes may also be represented as nodes. For example, nodes representing the property "Population" or "Location" may be connected to the entity type node "City." The combination and/or arrangement of an entity type and its properties is referred to as a schema. In some implementations, schemas are stored in tables or other suitable data structures associated with an entity type node. In some implementations, the knowledge graph may be self-defining or bootstrapping, such that it includes particular nodes and edges that define the concept of nodes, edges, and the graph itself. For example, the knowledge graph may contain an entity node "Knowledge Graph" that is connected to property nodes that describe a knowledge graph's properties such as "Has Nodes" and "Has Edges."

Specific values, in some implementations referred to as literals, may be associated with a particular entity in a terminal node by an edge defining the relationship. Literals may refer to values and/or strings of information. For example, literals may include dates, names, and/or numbers. In an example, the entity node "San Francisco" may be connected to a terminal node containing the literal "815,000" by an edge annotated with the property "Has Population." In some implementations, terminal nodes may contain a reference or link to long text strings and other information stored in one or more documents external to the knowledge graph. In some implementations, literals are stored as nodes in the knowledge graph. In some implementations, literals are stored in the knowledge graph but are not assigned a unique identification reference as described below, and are not capable of being associated with multiple entities. In some implementations, literal type nodes may define a type of literal, for example "Date/Time," "Number," or "GPS Coordinates."

In some implementations, the grouping of an edge and two nodes is referred to as a triple. The triple represents the relationship between the nodes, or in some implementations, between the node and itself. In some implementations, higher order relationships are modeled, such as quaternary and n-ary relationships, where n is an integer greater than 2. In some implementations, information modeling the relationship is stored in a node, which may be referred to as a mediator node. In an example, the information "Person X Donates Artifact Y To Museum Z" is stored in a mediator node connected entity nodes to X, Y, and Z, where each edge identifies the role of each respective connected entity node.

In some implementations, the knowledge graph may include information for differentiation and disambiguation of terms and/or entities. As used herein, differentiation refers to the many-to-one situation where multiple names are associated with a single entity. As used herein, disambiguation refers to the one-to-many situation where the same name is associated with multiple entities. In some implementations, nodes may be assigned a unique identification reference. In some implementations, the unique identification reference may be an alphanumeric string, a name, a number, a binary code, any other suitable identifier, or any combination thereof. The unique identification reference may allow the search system to assign unique references to nodes with the same or similar textual identifiers. In some implementations, the unique identifiers and other techniques are used in differentiation, disambiguation, or both.

In some implementations of differentiation, a node may be associated with multiple terms or differentiation aliases in which the terms are associated with the same entity. For example, the terms "George Washington," "Geo. Washington, "President Washington," and "President George Washington" may all be associated with a single entity, i.e., node, in the knowledge graph. This may provide differentiation and simplification in the knowledge graph.

In some implementations of disambiguation, multiple nodes with the same or similar names are defined by their unique identification references, by associated nodes in the knowledge graph, by any other suitable information, or any combination thereof. For example, there may be an entity node related to the city "Philadelphia," an entity node related to the movie "Philadelphia," and an entity node related to the cream cheese brand "Philadelphia." Each of these nodes may have a unique identification reference, stored for example as a number, for disambiguation within the knowledge graph. In some implementations, disambiguation in the knowledge graph is provided by the connections and relationships between multiple nodes. For example, the city "New York" may be disambiguated from the state "New York" because the city is connected to an entity type "City" and the state is connected to an entity type "State." It will be understood that more complex relationships may also define and disambiguate nodes. For example, a node may be defined by associated types, by other entities connected to it by particular properties, by its name, by any other suitable information, or any combination thereof. These connections may be useful in disambiguating, for example, the node "Georgia" that is connected to the node "United States" may be understood represent the U.S. State, while the node "Georgia" connected to the nodes "Asia" and "Eastern Europe" may be understood to represent the country in eastern Europe.

In some implementations, a node may include or connect to data defining one or more attributes. The attributes may define a particular characteristic of the node. The particular attributes of a node may depend on what the node represents. In some implementations, an entity node may include or connect to: a unique identification reference, a list of entity types associated with the node, a list of differentiation aliases for the node, data associated with the entity, a textual description of the entity, links to a textual description of the entity, other suitable information, or any combination thereof. As described above, nodes may contain a reference or link to long text strings and other information stored in one or more documents external to the knowledge graph. In some implementations, the storage technique may depend on the particular information. For example, a unique identification reference may be stored within the node, a short information string may be stored in a terminal node as a literal, and a long description of an entity may be stored in an external document linked to by a reference in the knowledge graph.

An edge in a knowledge graph may represent a semantic connection defining a relationship between two nodes. The edge may represent a prepositional statement such as "Is A," "Has A," "Is Of A Type," "Has Property," "Has Value," any other suitable statement, or any combination thereof. For example, the entity node of a particular person may be connected by a "Date Of Birth" edge to a terminal node containing a literal of his or her specific date of birth. In some implementations, the properties defined by edge connections of an entity may relate to nodes connected to the type of that entity. For example, the entity type node "Movie" may be connected to entity nodes "Actor" and "Director," and a particular movie may be connected by an edge property "Has Actor" to an entity node representing a particular actor.

In some implementations, nodes and edges define the relationship between an entity type node and its properties, thus defining a schema. For example, an edge may connect an entity type node to a node associated with a property, which may be referred to as a property node. Entities of the type may be connected to nodes defining particular values of those properties. For example, the entity type node "Person" may be connected to property node "Date of Birth" and a node "Height." Further, the node "Date of Birth" may be connected to the literal type node "Date/Time," indicating that literals associated with "Date of Birth" include date/time information. The entity node "George Washington," which is connected to entity type node "Person" by an "Is A" edge, may also be connected to a literal "Feb. 22, 1732" by the edge "Has Date Of Birth." In some implementations, the entity node "George Washington" is connected to a "Date Of Birth" property node. It will be understood that in some implementations, both schema and data are modeled and stored in a knowledge graph using the same technique. In this way, both schema and data can be accessed by the same search techniques. In some implementations, schemas are stored in a separate table, graph, list, other data structure, or any combination thereof. It will also be understood that properties may be modeled by nodes, edges, literals, any other suitable data, or any combination thereof.

For example, the entity node "George Washington" may be connected by an "Is A" edge to the entity type node representing "Person," thus indicating an entity type of the entity, and may also be connected to a literal "Feb. 22, 1732" by the edge "Has Date Of Birth," thus defining a property of the entity. In this way, the knowledge graph defines both entity types and properties associated with a particular entity by connecting to other nodes. In some implementations, "Feb. 22, 1732" may be a node, such that it is connected to other events occurring on that date. In some implementations, the date may be further connected to a year node, a month node, and a day of node. It will be understood that this information may be stored in any suitable combination of literals, nodes, terminal nodes, interconnected entities, any other suitable arrangement, or any combination thereof.

FIG. 9 shows illustrative knowledge graph portion 900. Knowledge graph portion 900 includes information related to the entity "George Washington," represented by "George Washington" node 902. "George Washington" node 902 is connected to "U.S. President" entity type node 904 by "Is A" edge 914 with the semantic content "Is A," such that the 3-tuple defined by nodes 902 and 904 and the edge 914 contains the information "George Washington is a U.S. President." Similarly, the information "Thomas Jefferson Is A U.S. President" is represented by the tuple of "Thomas Jefferson" node 910, "Is A" edge 920, and "U.S. President" node 904. Knowledge graph portion 900 includes entity type nodes "Person" 924, and "U.S. President" node 904. The person type is defined in part by the connections from "Person" node 924. For example, the type "Person" is defined as having the property "Date Of Birth" by node 930 and edge 932, and is defined as having the property "Gender" by node 934 and edge 936. These relationships define in part a schema associated with the entity type "Person."

"George Washington" node 902 is shown in knowledge graph portion 900 to be of the entity types "Person" and "U.S. President," and thus is connected to nodes containing values associated with those types. For example, "George Washington" node 902 is connected by "Has Gender" edge 918 to "Male" node 906, thus indicating that "George Washington has gender "Male." Further, "Male" node 906 may be connected to the "Gender" node 934 indicating that "Male Is A Type Of Gender." Similarly, "George Washington" node 902 is be connected by "Has Date of Birth" edge 916 to "Feb. 22, 1732" node 908, thus indicating that "George Washington Has Date Of Birth Feb. 22, 1732." "George Washington" node 902 may also be connected to "1789" node 928 by "Has Assumed Office Date" edge 930.

Knowledge graph portion 900 also includes "Thomas Jefferson" node 910, connected by "Is A" edge 920 to entity type "U.S. President" node 904 and by "Is A" edge 928 to "Person" entity type node 924. Thus, knowledge graph portion 900 indicates that "Thomas Jefferson" has the entity types "U.S. President" and "Person." In some implementations, "Thomas Jefferson" node 910 is connected to nodes not shown in FIG. 9 referencing his date of birth, gender, and assumed office date.

It will be understood that knowledge graph portion 900 is merely an example and that it may include nodes and edges not shown. For example, "U.S. President" node 904 may be connected to all of the U.S. Presidents. "U.S. President" node 904 may also be connected to properties related to the entity type such as a duration of term, for example "4 Years," a term limit, for example "2 Terms," a location of office, for example "Washington D.C.," any other suitable data, or any combination thereof. For example, "U.S. President" node 904 is connected to "Assumed Office Date" node 938 by "Has Property" edge 940, defining in part a schema for the type "U.S. President." Similarly, "Thomas Jefferson" node 910 may be connected to any suitable number of nodes containing further information related to his illustrated entity type nodes "U.S. President," and "Person," and to other entity type nodes not shown such as "Inventor," "Vice President," and "Author." In a further example, "Person" node 924 may be connected to all entities in the knowledge graph with the type "Person." In a further example, "1789" node 928 may be connected to all events in the knowledge graph with the property of year "1789." "1789" node 928 is unique to the year 1789, and disambiguated from, for example, a book entitled "1789," not shown in FIG. 9, by its unique identification reference. In some implementations, "1789" node 928 is connected to the entity type node "Year."

FIG. 10 shows illustrative knowledge graph portion 1000. Knowledge graph portion 1000 includes "California" node 1002, which may also be associated with differentiation aliases such as, for example, "CA," "Calif.," "Golden State," any other suitable differentiation aliases, or any combination thereof. In some implementations, these differentiations are stored in "California" node 1002. California is connected by "Is A" edge 1004 to the "U.S. State" entity type node 1006. "New York" node 1010 and "Texas" node 1014 are also connected to "U.S. State" node 1006 by "Is A" edges 1008 and 1012, respectively. "California" node 1002 is connected by "Has Capital City" edge 1020 to "Sacramento" node 1022, indicating the information that "California Has Capital City Sacramento." Sacramento node 1022 is further connected by "Is A" edge 1024 to the "City" entity type node 1026. Similarly, "Texas" node 1014 is connected by "Has City" edge 1020 to "Houston" node 1028, which is further connected to the "City" entity type node 1026 by "Is A" edge 340. "California" node 1002 is connected by "Has Population" edge 1016 to node 1018 containing the literal value "37,691,912." In an example, the particular value "37,691,912" may be periodically automatically updated by the knowledge graph based on an external website or other source of data. Knowledge graph portion 1000 may include other nodes not shown. For example, "U.S. State" entity type node 1006 may be connected to nodes defining properties of that entity type such as "Population" and "Capital City." These entity type—property relationships may be used to define other relationships in knowledge graph portion 1000 such as "Has Population" edge 1016 connecting entity node "California" 1016 with terminal node 1018 containing the literal defining the population of California.

It will be understood that while knowledge graph portion 900 of FIG. 9 and knowledge graph portion 1000 of FIG. 10 below show portions of a knowledge graph, all pieces of information may be contained within a single graph and that these selections illustrated herein are merely an example. In some implementations, separate knowledge graphs are maintained for different respective domains, for different respective entity types, or according to any other suitable delimiting characteristic. In some implementations, separate knowledge graphs are maintained according to size constraints. In some implementations, a single knowledge graph is maintained for all entities and entity types.

A knowledge graph may be implemented using any suitable software constructs. In an example, a knowledge graph is implemented using object oriented constructs in which each node is an object with associated functions and variables. Edges, in this context, may be objects having associated functions and variables. In some implementations, data contained in a knowledge graph, pointed to by nodes of a knowledge graph, or both, is stored in any suitable one or more data repositories across one or more servers located in one or more geographic locations coupled by any suitable network architecture.

FIG. 11 shows flow diagram 1100 including illustrative steps for determining a search presentation technique in accordance with some implementations of the present disclosure. In some implementations, the user interfaces described in FIGS. 2-6 are used to present search results as described in flow diagram 1100. In some implementations, information flow diagram 700 of FIG. 7 is used in the steps of flow diagram 1100.

In step 1102, the search system determines an entity reference from a search query. In some implementations, a search query is received from a user using, for example, a textual search box, e.g., search box 202 of FIG. 2, voice command, image drag-and-drop, gesture recognition, camera input, any other suitable technique, or any combination thereof. The search query may be textual, image-based, audio-based, video-based, of any other suitable format, or any combination thereof.

In some implementations, the received search query includes a search query for an entity reference. An entity includes, for example, a person, place, thing, idea, other suitable search topic, or any combination thereof. In some implementations, an entity reference includes an abstract reference to the actual embodiment of a reference. In an example, the entity reference may be text or an image referring to an entity. For example, an entity may the concept such as magic, and an entity reference to the concept may be the word "Magic." In some implementations, the received query may include received search query 702 of FIG. 7, containing entity reference 704 of FIG. 7. In some implementations, a received search query includes more than one entity reference. Generally, entities will be distinguished herein from entity types. As used herein, entity types refer to a defining characteristic or grouping. For example, "George Washington" and "Thomas Jefferson" are both considered entities of the entity type "U.S. President." In another example, "China" and "Australia" are considered entities of the entity type "Country." It will be understood that some entities are associated with more than one entity type.

The search system determines an entity reference from the search query by parsing, by partitioning, by using natural language processing, by identifying parts of speech, by heuristic techniques, by identifying root words, by any other suitable technique, or any combination thereof. In some implementations, the entity reference includes text or other suitable content referencing any suitable topic, subject, person, place, thing, or any combination thereof.

In some implementations, the search system identifies data in a data structure associated with the entity reference. The data structure may include a knowledge graph as described above, a database, index, any other suitable collection of data, or any combination thereof.

In some implementations, the search system identifies more than one entity reference in a search query. In some implementations, the search system selects one of the entity references for further processing in generating a presentation technique. In some implementations, the search system selects one of the more than one identified entity references based on a global popularity score of that entity reference, a relevance and/or closeness to some or all elements of a search query, user input, user history, user preferences, relationships between the entity references as described in a data structure, any other suitable information, or any combination thereof. In some implementations, the search system uses all of the identified entity references in generating a presentation technique. In some implementations, the search system uses more than one entity reference to generate more than one presentation, as described below in step 1108.

In step 1104, the search system identifies a ranked list of properties associated with a type of the entity reference. The ranked list may include, for example, ranked list 706 of FIG. 7. In some implementations, ranked list 706 is associated with a schema table. In an example, the schema table includes properties associated with a type of the entity reference, i.e., an entity type, and ranked list 706 is an ordering of the properties in the schema table. In some implementations, the ranked list of properties is stored in a data structure such as a knowledge graph, in a database, in any other suitable data storage arrangement, or any combination thereof. In some implementations, a schema table is preprocessed. In some implementations, the ranked list is predetermined, is based on the received search, or any combination thereof. In an example, the search system may generate ranked lists and store them before search queries are received. In another example, the search system may modify stored ranked lists based on a received query. In some implementations, ranking of the list is based on popularity, search history, user preferences, search system developer input, system preferences, trends in global search history, recent search patterns, content, domain-specific ordering, any other suitable parameters, or any combination thereof. In an example of determining a ranked list, a system developer may manually create a ranked list. In another example, the search system may automatically generate lists based on global search history. It will be understood that the aforementioned techniques for generating a ranked list are merely an example and that any suitable technique or combination of techniques may be used.

In step 1106, the search system identifies a property for generating a presentation. In some implementations, the property for generating a presentation is identified based at least in part on the search query of step 1102 and on the type of the entity reference of step 1104. In some implementations, the property for generating a presentation is the property associated with an entity reference, as illustrated in diagram 700 of FIG. 7, that the search system uses to determine a presentation technique. In some implementations, the property for generating a presentation is one of the properties of the ranked list identified in step 1104. In some implementations, a property for generating a presentations is one of the properties described presentation technique associations 708, 710, and 712 of FIG. 7. For example, the search system may use the first property of the ranked list as the property for generating presentation. In some implementations, the property for generating presentation may be selected from the ranked list based on the ranking and the search query, based on user input, based on any other suitable information, or any combination thereof.

In step 1108, the search system determines a presentation technique associated with the property for generating a presentation. In some implementations, the search system may associate a particular presentation technique with the property for generating presentation identified in step 1108, and may determine a presentation technique using that data. In some implementations, multiple presentation techniques may be determined for multiple properties of the ranked list of properties. In some implementations, the user interfaces illustrated in FIGS. 2-6 are examples of presentation techniques that may be determined and generated based on the property for generating a presentation. For example, the where the property for generating a presentation is "Location," a map presentation such as that of user interface 300 of FIG. 3 may be generated.

In some embodiments, where more than one entity reference was determined from a search query in step 1102, the system may use the two or more identified entity references to determine two or more presentations techniques and select one of the presentations techniques based on user input, a relevance and/or closeness to the search query, user history, user preferences, relationships between the two entities as described in a data structure, the strength of relationships between an entity and a presentation as described in a data structure, global history, a global popularity score, any other suitable content, or any combination thereof. For example, the search system may receive the search query "Portrait Paintings by Van Gogh 1870-1885" and associate "1870-1885" with a timeline and "Paintings" with an image gallery. The search system may have a stronger association for paintings in a gallery and years in a timeline, and select the gallery for presentation.

In step 1110, the search system causes search results to be presented. In some implementations, the search results are presented using the presentation technique determined in step 1108. In some implementations, causing search results to be presented includes presenting a presentation on a display screen of a user device. In some implementations, causing search results to be presented includes generating audio, video, text, images, any other suitable content, or any combination thereof. In some implementations, presenting search results includes a voice narration of content that may or may not also be presented visually. For example, the presentation may be presented on a smartphone, laptop computer, desktop computer, tablet computer, any other suitable user device, or any combination thereof. In another example, an audio presentation may be presented using a speaker on a smartphone or other computer. In some implementations, the user interfaces illustrated in FIGS. 2-6 may be used to present search results.

Figure 12:
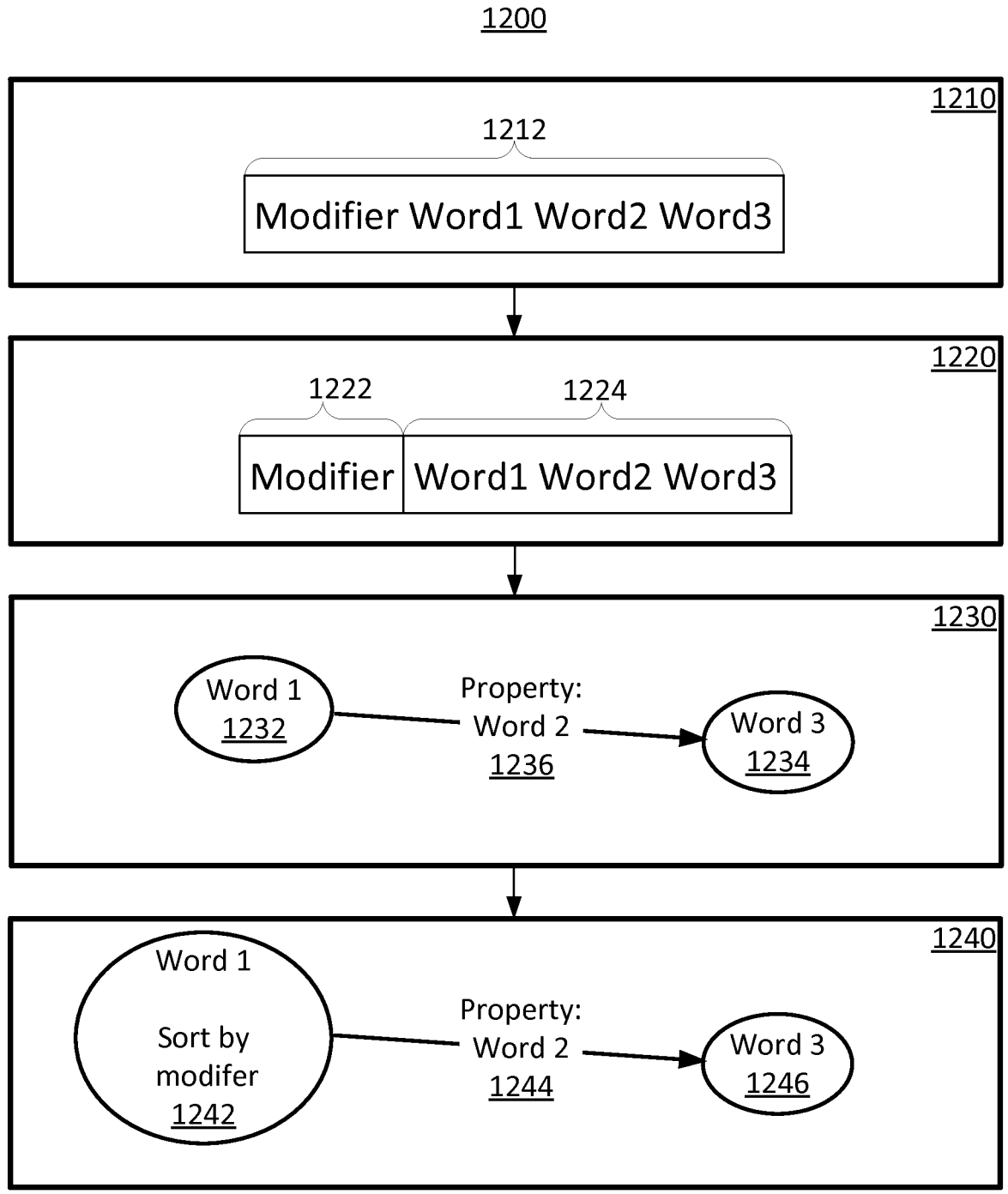
FIG. 12 shows a flow diagram including illustrative steps for ranking search results in accordance with some implementations of the present disclosure.

FIG. 12 shows a flow diagram including illustrative steps for ranking search results in accordance with some implementations of the present disclosure. In some implementations, flow diagram 1200 illustrates some of the steps of processing block 106 of FIG. 1.

Block 1210 includes search query 1212. In an example, search query 1212 is included in search query block 102 of FIG. 1. Search query 1212 includes the text "Modifier Word1 Word2 Word3." In some implementations, the modifier may be, or may refer to a superlative or other comparative word or words. In an example, the search query may include the text "Oldest City in Europe," where "Oldest" corresponds to "Modifier," "City" corresponds to "Word1," "in" corresponds to "Word2," and "Europe" corresponds to "Word3." It will be understood that the particular length, content, and arrangement of search terms is merely an example. For example, the modifier may be implicit, explicit, occur at any point in the query, and include any suitable number of words. It will be understood that an implicit modifier will not appear as an independent word or phrase in the search query. It will be understood that the modifier may be more than one word.

In block 1220, search query is divided into modifier portion 1222 and search portion 1224. The search system identifies the portions by any suitable technique, such as natural language processing, matching a list of predetermined modifiers, identification based on other terms in the search query, by any other suitable technique, or any combination thereof. It will be understood that when the modifying concept is implicit, modifier 1222 is omitted.

In block 1230, the search system generates a query tree based on search portion 1224. Generating a query tree is described in detail below. In some implementations, the search system generates a topology of nodes and edges, and assigns the terms of search portion 1224 to those nodes and edges. The search terms of search portion 1224 are associated with elements in a data structure such as a knowledge graph. The search system replaces the search terms associated with the nodes and edges with the corresponding data structure elements. In the illustrated example, "Word1" 1232 is identified as a root node, "Word3" 1234 is identified as a child node, and "Word2" is identified as a property defining the relationship between "Word1" and "Word3." In an example, where search portion 1224 is "City in Europe," the root node may be "City," connected an edge "In The Continent" to child node "Europe," such that the tree expresses the information "City in the continent Europe." In some implementations, the same query tree may be generated for multiple search queries. In an example, the search queries "European Cities," "Cities In Europe," "City in Europe," "Towns in Europe," and other suitable search queries may cause the search system to generate the described search query.

In block 1240, the search system annotates the root node 1242 of the query tree with a modifier, which may correspond to modifier 1222. Search block includes edge 1244 which may include the same information as edge 1236 of block 1230, and child node 1246 may include the same information as child node 1234 of block 1230. In some implementations, rules, directions such as largest to smallest, and other sorting information may be included in the annotation of root node 1242. In an example, where modifier 1222 is "Oldest," root node 1242 may be annotated with the information "Sort By Age, Oldest To Youngest," such that the tree expressed the information "Cities In The Continent Europe, Sorted By Age From Oldest To Youngest."

FIGS. 13-16 describe techniques included in generating a query tree, such as the query tree of block 1230 of FIG. 12. It will be understood that a query tree may be generated by any suitable technique. It will further be understood that search results may be ranked without using a query tree. In some implementations, generating a query tree may depend in part on information stored in a knowledge graph such as the knowledge graph described in FIGS. 8-10.

Figure 13:
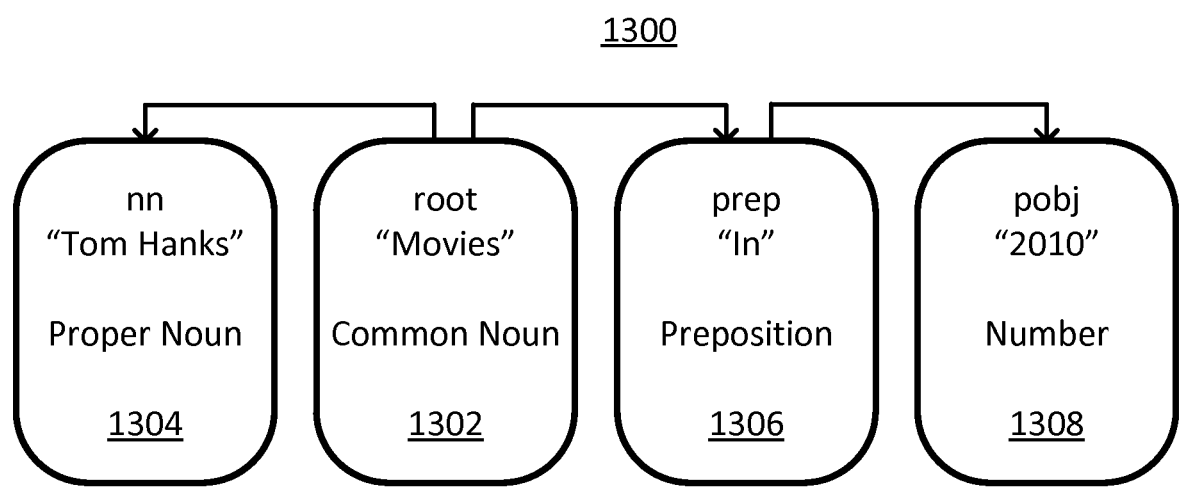
FIG. 13 shows an illustrative natural language processing diagram in accordance with some implementations of the present disclosure.

FIG. 13 shows illustrative natural language processing diagram 1300 in accordance with some implementations of the present disclosure. In some implementations, the search system uses natural language processing to parse a search query. Parsing may include identifying words, parts of speech, meanings, and relationships between words in the query.

Diagram 1300 shows the natural language processing of the search query "Tom Hanks Movies in 2010." In some implementations, the search system divides the query into search units "Tom Hanks" 1304, "Movies" 1302, "In" 1306 and "2010" 1308. In some implementations, the search system divides the search query based on a phrase dictionary, search history, user preferences, predetermined parameters, system settings, any other suitable parameters, or any combination thereof. In some implementations, the search system determines the part of speech of each search unit. For example, the search system may determine that "Movies" 1302 is a common noun, "Tom Hanks" 1304 is a proper noun, "In" 1306 is a preposition, and "2010" 1308 is a number. It will be understood that this particular part of speech notation is merely an example and that any suitable identification and/or notation may be used. In some implementations, the search system determines the semantic function or dependency of the search unit in the search query. For example, the search system may determine that "Movies" 1302 is the root of the query, "Tom Hanks" 1304 is a noun modifier, i.e. it modifies the root, "In" 1306 is a preposition, and "2010" 1308 is the object of the preposition. In some implementations, the search system assigns a directional relationship between the search units as illustrated in diagram 1300. For example, "In" 1306 and "Tom Hanks" 1304 is a child node of the root "Movies" 1302, and 2010 is a child of "In" 1306. In some implementations, natural language processing is used to identify related nodes in a knowledge graph, uses information from the knowledge graph, relates to a data structure such as the knowledge graph in any suitable way, or any combination thereof. It will also be understood that the search system may perform natural language processing without relying on the knowledge graph.

Figure 14:
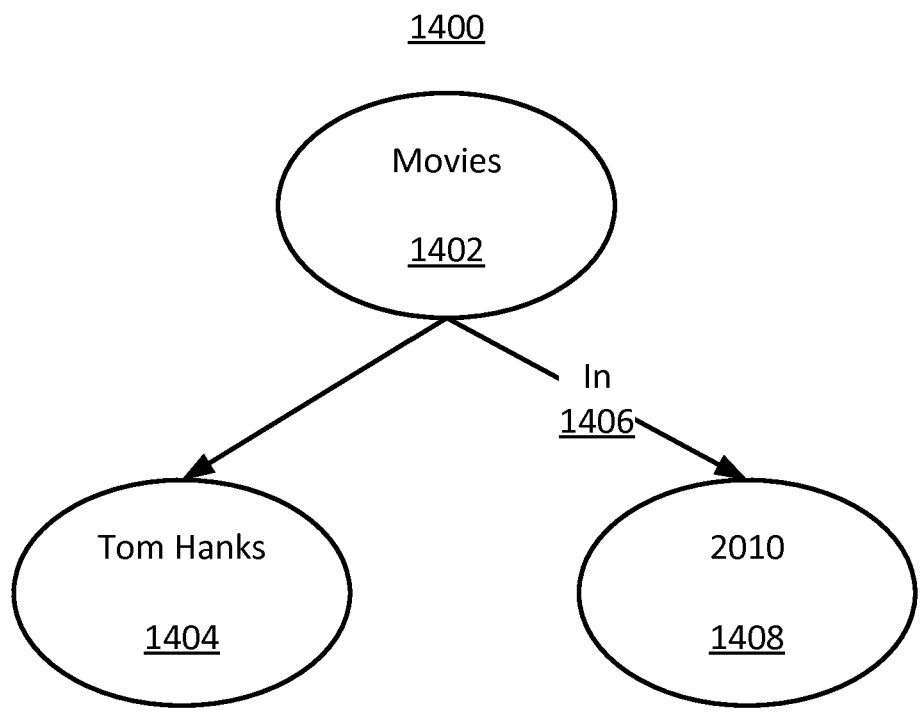
FIG. 14 shows an illustrative phrase tree in accordance with some implementations of the present disclosure.

FIG. 14 shows illustrative phrase tree 1400 in accordance with some implementations of the present disclosure. In some implementations, the phrase tree is generated by assigning words and phrases from search query to a tree topology. In some implementations, a tree topology includes nodes and edges. In the illustrated example, the received search query is "Tom Hanks Movies in 2010." The search system divides the received query into several search units that include one or more words. The search unit "Movies" is assigned to root node 1402. The search unit "Tom Hanks" is assigned to child node 1404. The search unit "In" is assigned to edge 1406. The search unit "2010" is assigned to grandchild node 1408. It will be understood that in some implementations, nodes of tree topologies may be associated with edges or nodes in a phrase tree, e.g., edge 1406. In some implementations, the dependence identified by natural language processing relates to the structure of the phrase tree. It will be understood this is merely an example and that in some implementations, other techniques may be used.

It will be understood that phrase tree 1400 is merely an example and that any suitable tree or other structural processed query may be generated based on any suitable search query. It will also be understood that in some implementations, the query tree is a theoretical construct and that the search system, while relying on the relationships described by the phrase tree, does not use a graphical representation as shown in FIG. 14.

Figure 15:
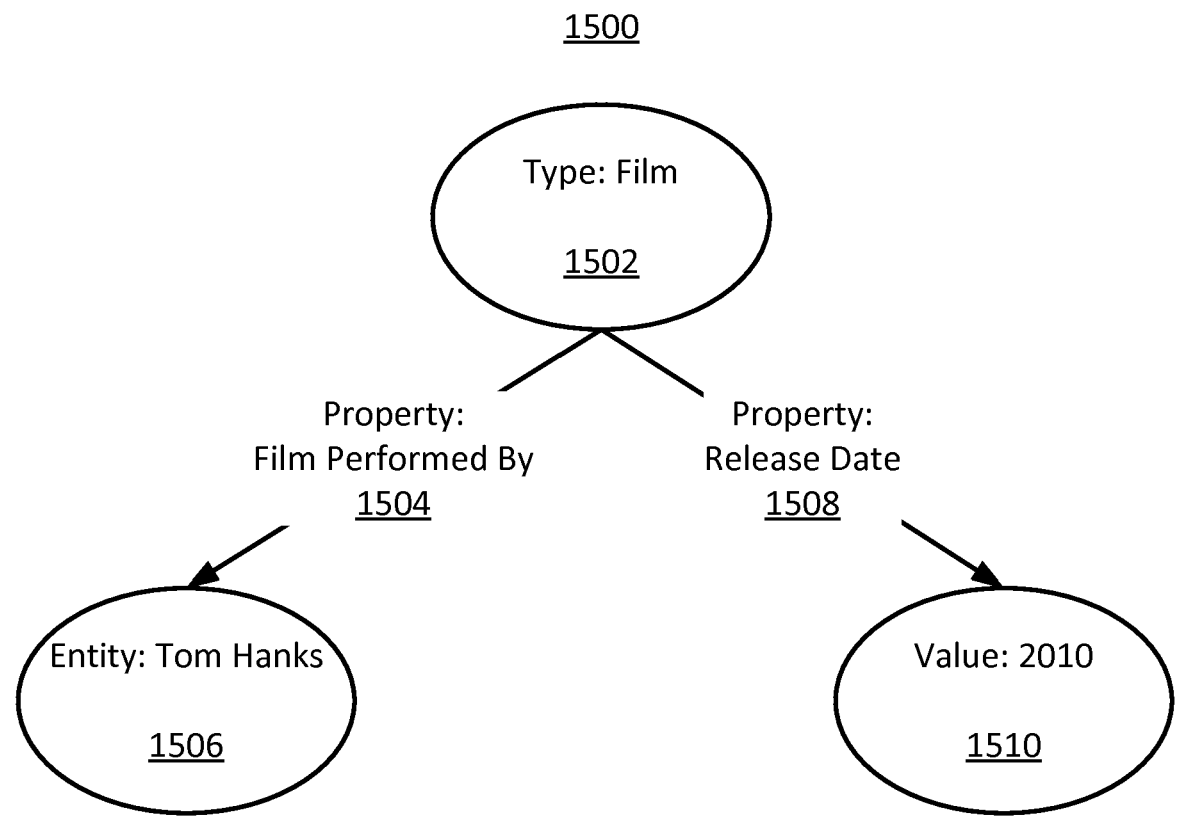
FIG. 15 shows an illustrative query tree in accordance with some implementations of the present disclosure.

FIG. 15 shows an illustrative query tree in accordance with some implementations of the present disclosure. In some implementations, the search system generates one or more query trees based on one or more phrase trees. In some implementations, a query tree will have an identical topology as a corresponding phrase tree. In some implementations, the search system identifies data in a data structure such as a knowledge graph, where the data is associated with each of the search units assigned to a phrase tree. The search system generates a query tree by placing the data structure data, or a reference to the data, in a location on the query tree corresponding to the related search unit's location on a phrase tree.

Query tree 1500 includes a query tree that relates to phrase tree 1500 of FIG. 15. Query tree 1500 includes "Type: Film" root node 1502. In some implementations, root node 1502 corresponds to the search query term of "Movies" root node 1402 of FIG. 14. In some implementations, the search system may identify data in a data structure such as a knowledge graph that the search unit "Movies" relates to an entity type node "Film." The search system may build a query tree where the root node is associated with the "Film" node of the knowledge graph. In some implementations, the query tree may also include unique identification references associated with related data structure nodes, strings, values, node relationship information, any other suitable information, or any combination thereof.

Query tree 1500 includes "Entity: Tom Hanks" node 1506 connected to root node 1502 by "Property: Film Performed By" edge 1504. Similar to the root node, node 1506 may be assigned based on the identified data structure data associated with phrase tree node 1404 of FIG. 14. Query tree 1500 includes "Value:2010" node 1510, connected to root node 1502 by "Property: Release Date" edge 1508. Node 1510 may be associated with, for example, a terminal node containing the value "2010" in the data structure. It will be understood that query tree 1500 is merely an example and that any suitable query tree may be generated based on any suitable search query.

In some implementations, the search system may identify related data structure data based on popularity, system settings, user preferences, predetermined parameters, ranked lists, relationships with other search units, any other suitable information, or any combination thereof. For example, the search system may assign the famous actor "Tom Hanks" to node 1506 rather than "Tom Hanks" the seismologist because of the global popularity of the actor. In some implementations, "Tom Hanks" the actor may be selected due to the word "Movies" in the search query. In some implementations, a search query for "Tom Hanks Earthquake" may result in the search unit "Tom Hanks" being associated with "Tom Hanks" the seismologist in the data structure. In another example, where "Tom Hanks" is the only search unit, the search system may rely on a popularity score.

In some implementations, the search system may assign information to the edges of the query tree based on relationships in the data structure between nodes related to the query tree nodes. For example, the search system may identify a "Tom Hanks" entity reference in the data structure and a "Film" entity type in the data structure. The search system may determine that the relationship between the data structure nodes is "Film Performed By." The search system may assign "Film Performed By" to edge 1504 of the query tree. In some implementations, edges of the query tree may be assigned based on data structure relationships, data structure properties, search units, related search queries, user input, user preferences, system settings, predetermined parameters, any other suitable information, or any combination thereof.

In some implementations, several query trees may be generated based on several phrase trees. In some implementations, query trees may be generated for multiple tree topologies. In some implementations, a topology may be selected based on the relationships identified between nodes of the data structure. Thus, if the topology of a query tree requires a relationship to be assigned between two nodes that are not related or are weakly related in a data structure, the search system may consider that tree topology to be less favorable than a topology where the unrelated nodes are on separate branches of the tree. In some implementations, the search system assigns a score to each generated query tree and selects the tree with the most desirable score. In some implementations, the score is based on relationships in the data structure between associated nodes, user preferences, global popularity, system settings, predetermined parameters, any other suitable information, or any combination thereof. For example, a higher score may be assigned to a query tree including edge properties that are more commonly accessed or more popular in the data structure than a less commonly accessed or less popular property. In another example, edge properties include a ranking that contributes to a query tree's score.

Figure 16:
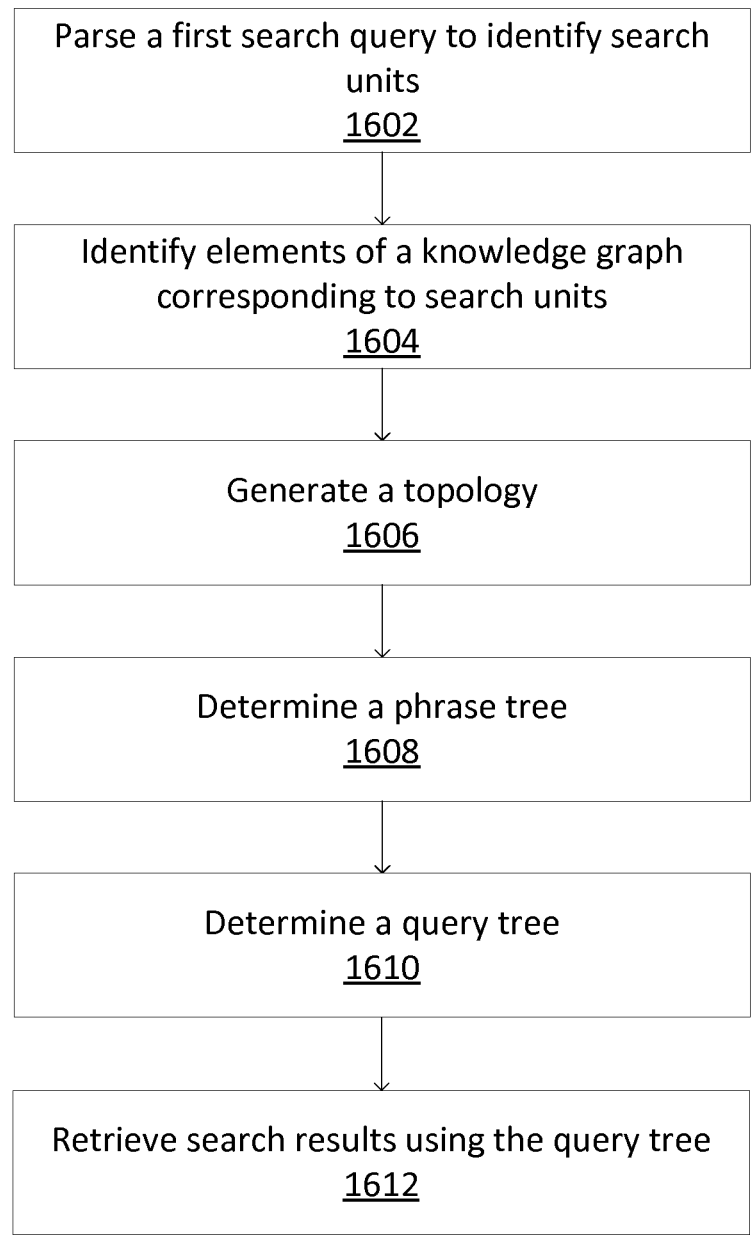
FIG. 16 shows a flow diagram including illustrative steps for generating a query tree in accordance with some implementations of the present disclosure.

FIG. 16 shows flow diagram 1600 including illustrative steps for generating a query tree in accordance with some implementations of the present disclosure. In some implementations, steps of flow diagram 1600 relate to steps illustrated by FIGS. 13-15. In some implementations, the steps of flow diagram 1600 include a data structure such as a knowledge graph, database, index, any other suitable structure, or any combination thereof. A knowledge graph, described further below, includes nodes and edges, where information is represented by data stored in nodes and annotated edges that describe the relationships between the nodes.

In step 1602, the search system parses a first search query to identify search units. In some implementations, a search query is parsed into one or more search units. In some implementations, a search unit includes one or more words. For example, a search unit may be a single word such as "Movies," or phrase such as "Tom Hanks." In some implementations, a received search request is partitioned into several search queries. For example, a search query may be parsed as illustrated in block 1220 of FIG. 12. In some implementations, parsing may include natural language parsing as illustrated in diagram 1300 of FIG. 13. In some implementations, search units are identified by matching parts of a search query with nodes in the knowledge graph. In an example, the search query "Best Buy" may be identified as related to the electronics store "Best Buy," a single data structure node, or may be identified as relating to two separate knowledge graph nodes for "Best" and "Buy." The search system may determine partitioning based on global popularity, user preferences, user input, system settings, any other suitable information, or any combination thereof. In some implementations, the search system presents several possible search units to the user for refinement and/or selection. In some implementations, the search system performs subsequent steps of flow diagram 1600 using multiple combinations of search units and selects a search unit combination based on, for example, query trees or search results. In some implementations, parsing a search query includes natural language processing.

In step 1604, the search system identifies elements of a data structure, such as a knowledge graph, corresponding to search units. In an example, the search system identifies a node or edge in a knowledge graph that corresponds to the search units identified in step 1602. In some implementations, identifying a corresponding node or edge includes identifying similar or matching text, similar or matching related properties, any other suitable technique, or any combination thereof. For example, the search query "Movies" may be identified as corresponding to the knowledge graph node "Film." In some implementations, multiple possible corresponding nodes may be identified and a node may be selected based on global popularity, relevance of the match, related nodes in the knowledge graph, other search units, user input, predetermined parameters, user preferences, system settings, any other suitable information, or any combination thereof.

In step 1606, the search system generates a topology. In some implementations, topologies include an arrangement of nodes and edges. In some implementations, the number of nodes is the same as the number of search units. In some implementations, the search system generates several topologies. In some implementations, the search system selects one of the several topologies in subsequent processing steps, such as after generating query trees from each of the tree topologies. In some implementations, the particular arrangement of the topology is based in part on natural language processing and/or any other suitable technique for identifying dependencies and relationships between search units. In some implementations, the number of nodes may be the same as the number of search units. In some implementations, the number of nodes may be adjusted from the number of search units based on the content of those units. For example, articles such as "a" and "the" may be omitted in determining the number of nodes.

In step 1608, the search system generates a phrase tree. In some implementations, phrase tree 1400 of FIG. 14 is an example of the phrase tree generated in step 1608. In some implementations, the phrase tree of step 1608 may include the tree topology generated in step 1606. In some implementations, the search system assigns the search units identified in step 1602 to the nodes of the tree topology generated in step 1606. In some implementations, the nodes of the tree topology are assigned to edges of the phrase tree. For example, as illustrated in phrase tree 1400 of FIG. 14, the search unit "In" is assigned to an edge. In some implementations, multiple phrase trees are generated by assigning search units in different arrangements to the nodes of the tree topologies. Similarly, multiple phrase trees are generated based on the multiple tree topologies. In some implementations, a phrase tree is selected from the multiple phrase trees based on data in a data structure such as a knowledge graph, natural language processing, user input, system settings, further processing of the phrase tree such as the generation of query trees, predetermined parameters, any other suitable information, or any combination thereof.

In step 1610, the search system generates a query tree. In some implementations, a query tree is generated in part based on the phrase tree generated in step 1608 and the elements of a data structure corresponding to search units identified in step 1604. In some implementations, query tree 1500 of FIG. 15 is an example of the query tree generated in step 1510. In some implementations, the query tree generated in step 1610 may have the same topology as the phrase tree generated in step 1608. In some implementations, the search system may assign data from the data structure to a node of the query tree. In some implementations, the data from the data structure is the data identified as corresponding to the search unit that was assigned to the node of the phrase tree in the same location. Thus, generating the query tree may be viewed as replacing the search units assigned to the nodes of the phrase tree with their corresponding data structure elements.

In some implementations, information is assigned to the edges of the query tree as described for query tree 1500 of FIG. 15. In some implementations, relationships between nodes of the query tree may be identified based on relationships between corresponding nodes in a data structure. For example, if the nodes corresponding to two nodes in a query tree are connected by a particular property in the data structure, the query tree edge connecting those nodes may be assigned that property. In some implementations, query tree edges may be assigned based on data structure data, search units, search queries, user input, system settings, global search history, user preferences, any other suitable preferences, or any combination thereof. In some implementations, nodes of the query tree are associated with any suitable data from the data structure, for example, entity nodes, entity type nodes, literals, strings, or any combination thereof. In some implementations, multiple query trees are generated based on multiple tree topologies of step 1606 and/or multiple phrase trees of step 1608. A query tree may be selected from the multiple query trees based on a score as described above, based on user input, by any other suitable technique, or any combination thereof.

In step 1612, the search system retrieves search results using the query tree. In some implementations, the search system may retrieve search results from a data structure such as a knowledge graph using the query tree. For example, the search system may retrieve entity references from a data structure with relationships that match the relationships described by the query tree. In some implementations, the search system may use the query tree to retrieve search results from the internet, from a database, from a list of information, from any other suitable data or data structure, or any combination thereof. In an example, the search system may identify a portion of the data structure with relationships similar to those mapped by the query tree, and identify entity references related to the entity references included in the mapped relationships. In the example of query tree 1500 of FIG. 15, the search system may identify entity references of the data structure associated with the entity type "Film" that are connected to the entity reference "Tom Hanks" by the property "Film Performed By" and connected to the value 2010 by the property release date. It will be understood that mapping and comparing are performed by any suitable technique in any suitable order. It will also be understood that in some implementations, data in the query tree may relate to an MDL query, a Dgraph query, any other suitable query used to retrieve search results, or any combination thereof.

It will be understood that the steps of the flow diagram are merely an example and that in some implementations, steps may be added, omitted, duplicated, reordered, or otherwise modified.

Figure 17:
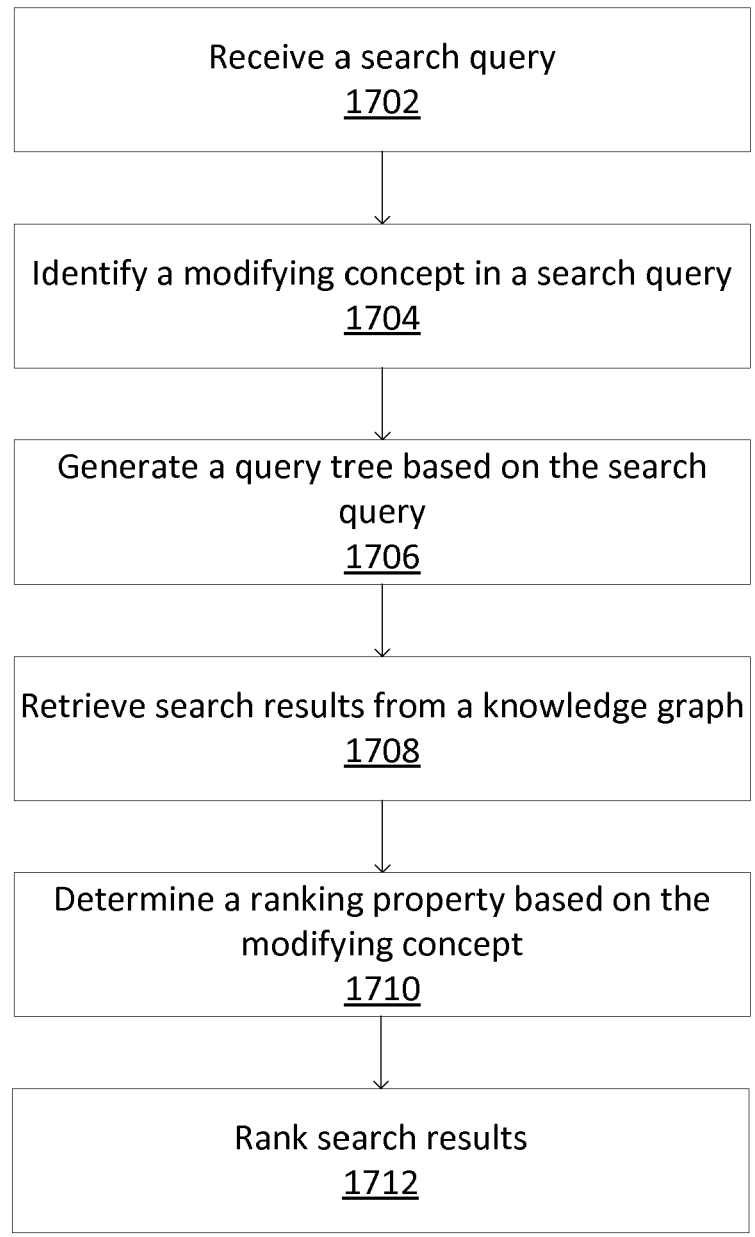
FIG. 17 shows a flow diagram including illustrative steps for ranking search results in accordance with some implementations of the present disclosure.

FIG. 17 shows a flow diagram including illustrative steps for ranking search results in accordance with some implementations of the present disclosure.

In step 1702, the search system receives as search query. In some implementations, the search system receives search results in a text box such as search query block 102 of FIG. 1. In some implementations, the search query may include a search query box as described for search query box 202 of FIG. 2. In an example, the search system receives a string of one or more words indicating a desired search. In some implementations, search queries include text, images, audio, any other suitable content, or any combination thereof.

In step 1704, the search system identifies a modifying concept in the search query. In some implementations, the search system may parse or otherwise process the search query received in step 1702 to identify a modifier. In an example, the search system uses natural language processing to identify an explicit search query, for example as described in diagram 1300 of FIG. 13. In some implementations, the search system identifies an implicit modifying concept using a data structure such as a knowledge graph that is associated with one or more words in a search query. In some implementations, the search system identifies an entity type associated with a search query. For example, the search system may determine that the release date is an implicit modifying concept for a search for movie titles. In another example, the search system may determine that building height is an implicit modifying concept associated with a search for skyscrapers. In some implementations, the search system determines more than one implicit, explicit, or both implicit and explicit modifying concept, and selects one or more of the modifying concepts based on popularity, user preferences, system settings, user history, global search history, relevance, any other suitable parameters, or any combination thereof.

In step 1706, the search system generates a query tree based on the search query. In some implementations, where the modifying concept is explicit, the search system generates a query tree based on the remainder of the search query without the modifying concept. In some implementations, where the search query is implicit, the search system uses the complete search query to generate a query tree. In some implementations, particular words or other elements of the search query are omitted in generating a query tree based on system settings, predetermined parameters, user preferences, search history, any other suitable parameters, or any combination thereof. In some implementations, a query tree is generated as described in flow diagram 1600 of FIG. 16. In some implementations, query tree 1500 of FIG. 15 is an example of the query tree generated in step 1706. It will be understood that the particular technique described for generating a query tree is merely an example and that any suitable technique may be used. It will also be understood that the particular tree described is merely an example and that the search system may generate any suitable structured search based on the received search query.

In step 1708, the search system retrieves search results from a knowledge graph. In some implementations, the search system retrieves search results from any suitable data structure, such as data structure block 104 of FIG. 1 and/or webpages block 110 of FIG. 1. In some implementations, the search results include entity references associated with the search query. In an example, for a search for "Skyscrapers," the search system may retrieve a collection of entity references to particular skyscraper buildings described in a data structure such as a knowledge graph. In some implementations, the collection of entity references may include names, links to webpages, descriptive information, links to other entity references in the data structure, any other suitable content, or any combination thereof. In the example, descriptive information for a skyscraper includes height, year constructed, location, residents, any other suitable information, or any combination thereof. In some implementations, the information is used in step 1712 below to rank the search results.

In step 1710, the search system determines a ranking property based on the modifier. Modifiers are described in detail below in reference to FIG. 18. In some implementations, the search system uses a technique for determining a ranking property based on the modifying concept being implicit or explicit. In some implementation, the search system uses a technique for determining a property based on the modifying concept being objective or subjective. In some implementations, the ranking property includes a direction, such as ascending or descending. For example, "Tallest Skyscraper" may be sorted from tallest to shortest.

FIG. 18 shows diagram 1800 including illustrative modifying concepts in accordance with some implementations of the present disclosure. Diagram 1800 contains modifying concepts 1802, which includes explicit modifying concepts 1804 and implicit modifying concepts 1806. Explicit modifying concepts 1804 include objective explicit concepts 1808 and explicit subjective concepts 1822. Implicit modifying concepts 1806 includes objective implicit concepts 1816 and subjective implicit concepts 1830.

In some implementations, the search system identifies a modifying concept that is classified as an explicit objective modifying concept. In some implementations, the modifying concept may be a superlative or other descriptor, as indicated by superlative 1810. For example, the search system may identify the superlative "Tallest" associated with search queries "Tallest building" and "Tall buildings." In another example, objective superlatives include "Oldest," "Longest," "Richest," "Biggest," and other suitable descriptors. In some implementations, the search system may identify an entity type associated with the search results retrieved in step 1710. For example, the search results may include entity references of the entity type "Building" or "People" in response to the search query "Tallest Skyscraper" or "Shortest Movie Star," respectively. In some implementations, the search system retrieves a ranking property from a list of predetermined ranking properties based on the superlative and the identified entity type. For example, ranking properties associated with entity type-superlative pairs may be predetermined and stored in a data structure such as data structure 104 of FIG. 1. In some implementations, the list of ranking properties is processed offline or otherwise predetermined. In some implementations, the list of ranking properties is determined based on system settings, analysis of previous searches, user preferences, search system developer input, any other suitable information, or any combination thereof.

In some implementations, the search system identifies an explicit, objective modifying concept with range intent, as indicated by superlative with range 1812. For example, a search query may include "Presidents After 2000" or "Mountains Higher Than 5000 m." In some implementations, the search system determines ranking properties based on the modifying concept, and applies the rule defined by the range intent. In an example, for the search query "Mountains Higher Than 5000 m," the search system may use the term "higher" to identify that search results should be sorted by height from tallest to shortest. The search system interpret the search term "5000 m" to indicate a desire to remove any search results with a height shorter than 5000 meters.

In some implementations, the search system identifies an explicit, objective modifying concept including a property preceded by the word "By" or otherwise indicated by a suitable preposition or other word, as indicated by Property with "by" 1814. In an example, "Buildings by height" or "Countries by GDP" are search queries where a sorting property is set off using the word "By." In some implementations, the search system identifies the property following the preposition, and uses that property to determine a ranking property. In an example, where the search query is "Countries By GDP," the search system may identify a collection of countries in a data structure, where each country in the collection includes information about its gross domestic product. The search system may determine the ranking property to be the gross domestic product based on the terms "By GDP" in the search query, and may rank the country with the highest GDP first and the lowest GDP last.

In some implementations, the search system identifies an implicit objective modifying concept, where the order is implicit in an entity type in the search query, as indicated by entity type 1818. In an example, where the search query is "TV Episodes" and the retrieved search results are a collection of television episodes, the search system may identify a release date ranking property. In some implementations, the search system includes predetermined ranking properties associated with entity types. For example, the search system may sort mountains by height, cities by population, and movies by release date. In some implementations, ranking properties are predetermined or determined at the time of search. In some implementations, ranking properties associated with an entity type are based on system developer input, user preferences, search history, system settings, any other suitable information, or any combination thereof.

In some implementations, the search system identifies an implicit objective modifying concept, where the order is implicit in a property in the search query, as indicated by entity property 1820. In an example, a book trilogy may be sorted in order of the series property. In another example, a list of actors in a movie may be sorted in an edited list associated with that movie, e.g., lead characters first, followed by order of appearance. In some implementations, properties may be edited for ranking, a property of the entity, associated with any other suitable content, or any combination thereof.

In some implementations, the search system identifies an explicit, subjective modifying concept. For example, the search query may include a superlative or other descriptor that includes a subjective evaluation of a particular entity or a property of the entity, as indicated by superlative 1824. For example, the modifying concepts "Best," "Funny," and "Influential," may be considered to be subjective.

In some implementations, an explicit subjective modifying concept includes a quality score, as indicated by quality score 1826. In an example, a quality score includes a ranking or rating. In an example, a modifying concept referring to a quality score includes "Best," or "Worst." For example, the search query "Best Movie of 2010" includes an explicit subjective modifying concept. In some implementations, the search system identifies data in a data structure that includes quality scores. Quality scores may be determined by global search history, extracting scores from external websites, search system developer input, user preferences, system settings, predetermined parameters, any other suitable technique, or any combination thereof. In an example, the search system retrieves movie review scores from a website such as IMDB. In another example, the search system may retrieve restaurant reviews from YELP and a newspaper. In some implementations, multiple quality scores associated with an entity are combined in a weighted or unweighted technique.

In some implementations, an explicit, subjective modifying concept includes a superlative or descriptor other than a superlative, as indicated by soft properties 1828. These descriptors may be referred to as soft properties. For example, "Funny" or "Strangest" may be examples of a soft property. In some implementations, the search system may associate a soft property value with an entity reference using a co-occurrence calculation. In some implementations, co-occurrence includes a calculation of the frequency that both the soft property term and an entity reference occur on the same webpage. For example, the search system may include a collection of internet webpage search results related to the search query. The search system may analyze each webpage to identify the entity references and/or the modifiers on those pages. The search system may count the number of occurrences, the distance between occurrences, any other suitable statistics, or any combination thereof. The search system may combine counts for multiple webpages to determine a soft property value. An illustrative expression for determining co-occurrence $C(E, RE_j)$ is shown by Eq. 1:

$$C(E, RE_j) = \frac{P(E, RE_j)}{P(E)} \quad (1)$$

in which $P(E)$ is the probability of finding entity reference E in a text corpus, e.g. one or more webpages, and $P(E, RE_j)$ is the probability of finding both the entity reference E and the related entity reference $RE_j$, indexed by index j, in the text corpus. In some embodiments, the search entity reference is the entity reference and the soft property is the related entity reference. Another illustrative expression for determining co-occurrence $C(E, RE_j)$ is shown by Eq. 2:

$$C(E, RE_j) = \frac{N(E, RE_j)}{N(E) + N(RE_j) - N(E, RE_j)} \quad (2)$$

in which $N(E)$ is the number of instances of entity reference E in a text corpus (e.g., one or more webpages), $N(RE_j)$ is the number of instances of related entity reference $RE_j$ in the text corpus, e.g., one or more webpages, and $N(E, RE_j)$ is the number of instances of both the entity reference E and the related entity reference $RE_j$ the text corpus. In some implementations, the one or more processors may normalize, scale, shift, or otherwise alter the co-occurrence value to convert them into relatedness metrics. It will be understood that the aforementioned equations are merely an example and that any suitable equation, technique, other suitable processing, or any combination thereof, may be used to determine a co-occurrence value or other soft property metric.

In some implementations, the search system identifies an implicit, subjective modifying concept. In some implementations, the entity references identified in the search query may be of one or more entity types. Where the referenced entity is only of a single entity type, the modifier may be referred to a single role entity, as indicated by single role entity 1832. In an example, a movie title is associated only with the type "Movie." In some embodiments, the search system may determine a ranking property based on the predetermined scores associated with the entity type. For example, the entity type may be associated with popularity information, search result information, recent search information, user preferences, system settings, search system developer parameters, any other suitable information, or any combination thereof.

In some implementations, entity references identified in the search query may be of more than one entity type, as indicated by multiple role entity 1834. In some implementations, the search system determines a ranking property for each respective entity type as described above for single role entities. In some implementations, the search system combines the ranking properties by a weighted technique. In some implementations, the weighting is based on the strength of the association between the entity and the entity type. For example, the entity reference "George Washington" may be much more strongly associated with the entity type "U.S. President" than with the entity type "Architect," and consequently the ranking property associated with the "U.S. President" type will have a larger impact on the combined ranking properties than the ranking property associated with the entity type "Architect." In some implementations, the associated information is based on user preferences, user history, popularity, co-occurrence, system settings, search system developer input, any other suitable parameters, or any combination thereof.

In some implementations, an implicit subjective modifying concept may include a relationship between two collections, as indicated by N:N relationship 1836. For example, the query "Oil Companies' Founders" includes both a collection of companies and a collection of people who have founded oil companies. This may be referred to as an N:N relationship, where N refers to a collection of entities. In some implementations, the search system determines ranking properties for the first collection as described above for single or multiple entity types. The search system determines a related entity reference or co-occurrence score for the first collection and the second collection based on web page results. In some implementations, co-occurrence is determined as described above. In some implementations, the search system multiplies the ranking properties determined for the first collection by the co-occurrence score to generate an N:N relationship ranking properties.

It will be understood that the aforementioned techniques for determining ranking properties are merely an example and that any suitable technique or combination of techniques may be used. In some implementations, a combination of the aforementioned techniques is used. It will also be understood that the search system may use any suitable parameters to select a technique for determining ranking properties. For example, a technique may be selected based on a search query, search results, user preferences, system settings, global search history, user search history, predetermined parameters, any other suitable information, or any combination thereof.

Referring back to flow diagram 1700 of FIG. 17, in step 1712, the search system ranks search results. In some implementations, the search system ranks the search results retrieved in step 1708 based on the ranking property determined in step 1710. In some implementations, the root node of the query tree is annotated with the ranking property, as illustrated in root node 1242 of FIG. 12. In some implementations, the ranking property includes a ranking direction, such as ascending or descending. In some implementations, ranking the search results includes ordering them, assigning one or more scores or metrics, assigning an importance value, assigning a numerical order, assigning a usefulness metric, any other suitable ranking technique, or any combination thereof. In an example, ten search results may be assigned an order: 1, 2, 3, 4, 5, 6, 7, 8, 9, 10. In another example, ten search results may be assigned a usefulness metric between 0 and 1, based on the ranking property.

FIG. 19 shows a flow diagram including illustrative steps for determining a rule for ranking search results in accordance with some implementations of the present disclosure. In some implementations, the steps of flow diagram 1900 are included in flow diagram 1700 of FIG. 17, are complementary to flow diagram 1700 of FIG. 17, or are used in any suitable combination with the steps of flow diagram 1700 of FIG. 17.

In step 1902, the search system identifies a modifying concept based on a search query. The search system may identify an explicit-subjective modifying concept, explicit-objective modifying concept, implicit-subjective modifying concept, implicit-objective modifying concept, any other suitable modifying concept, or any combination thereof. In some implementations, the search system identifies modifying concepts as described in step 1710 of FIG. 17 and diagram 1800 of FIG. 18. In some implementations, the concept is identified by parsing the search query, by natural language processing, by comparing terms of a search query to a database or data structure, by any other suitable technique, or any combination thereof.

In step 1904, the search system determines a rule for ranking search results. In some implementations, the rule is determined in one of the techniques described for determining a ranking property described in step 1710 of FIG. 17 and diagram 1800 of FIG. 18.

In step 1906, the search system ranks search results based on the rule determined in step 1904. In some implementations, search results include entity references from the knowledge graph. In some implementations, search results include a link to a web page, a brief description of the target of the link, contextual information related to the search result, an image related to the search result, video related to the search result, any other suitable information, or any combination thereof. In some implementations, the technique for ranking of search results in step 1906 depends in part on the particular rule determined in step 1904. In some implementations, ranking search results includes ordering, sorting, any other suitable technique, or any combination thereof. For example, search results may be ordered for presentation. In some implementations, ranking search results uses any suitable combination of techniques as described in step 1712 of FIG. 17.

Figure 20:
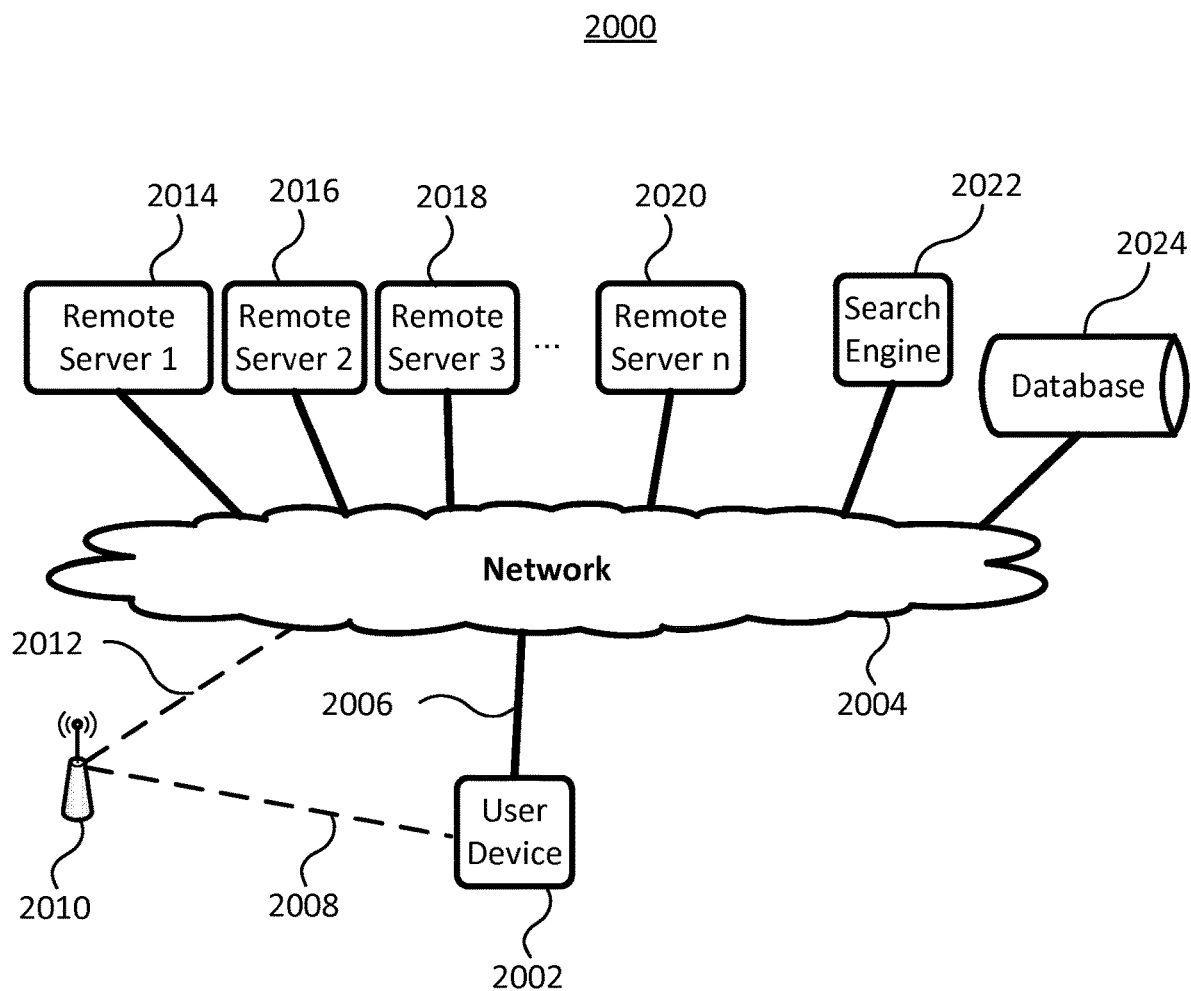
FIG. 20 shows an illustrative computer system that may be used to implement some or all features of the search system in accordance with some implementations of the present disclosure.
Figure 21:
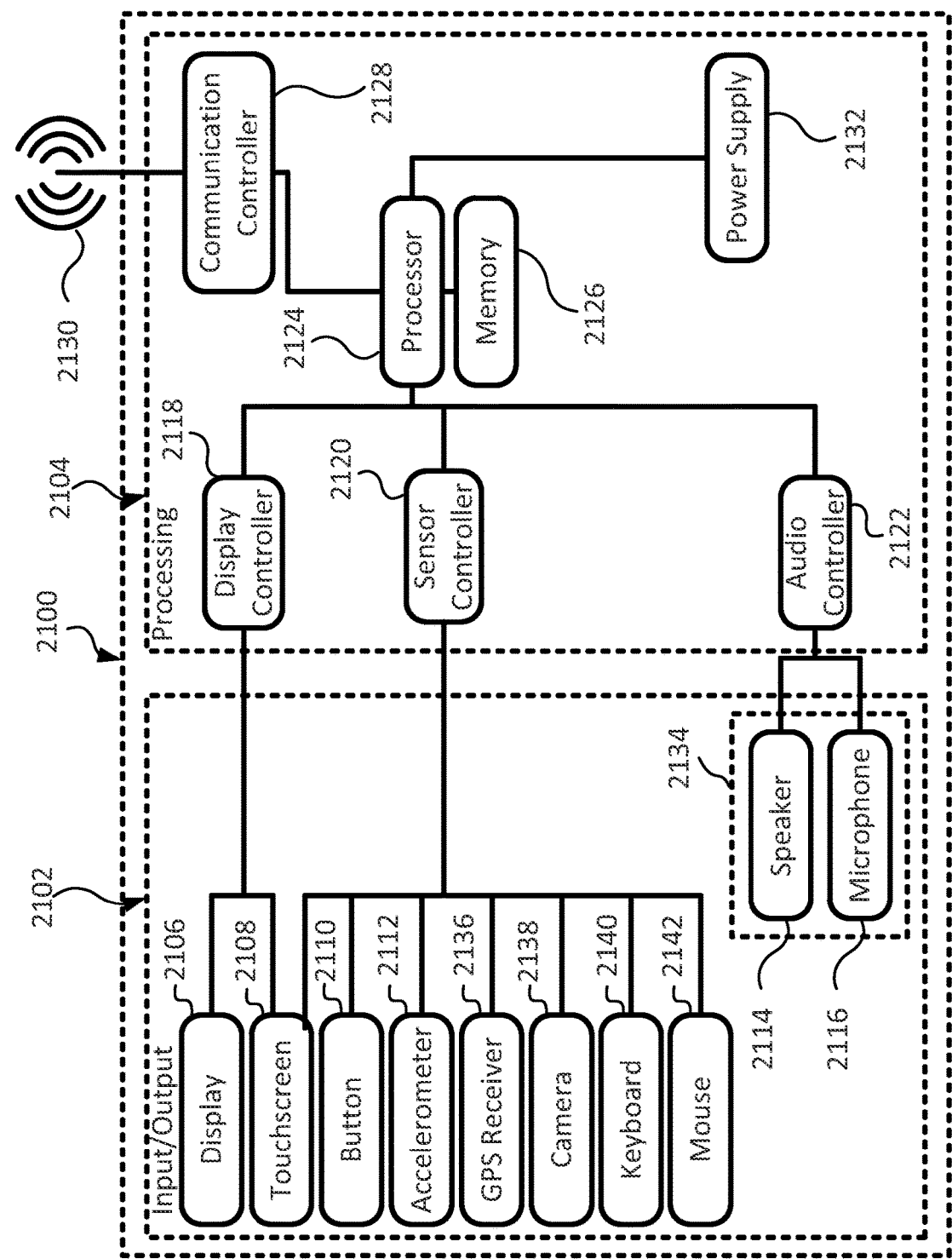
FIG. 21 is a diagram of a user device in accordance with some implementations of the present disclosure.

The following description and accompanying FIGS. 20-21 describe illustrative computer systems that may be used in some implementations of the present disclosure. It will be understood that the knowledge graph and associated techniques may be implemented on any suitable computer or combination of computers.

FIG. 20 shows an illustrative search system in accordance with some implementations of the present disclosure. System 2000 may include one or more user device 2002. In some implementations, user device 2002 may include a smartphone, tablet computer, desktop computer, laptop computer, personal digital assistant or PDA, portable audio player, portable video player, mobile gaming device, other suitable user device capable of providing content, or any combination thereof.

User device 2002 may be coupled to network 2004 directly through connection 2006, through wireless repeater 2010, by any other suitable way of coupling to network 2004, or by any combination thereof. Network 2004 may include the Internet, a dispersed network of computers and servers, a local network, a public intranet, a private intranet, other coupled computing systems, or any combination thereof.

User device 2002 may be coupled to network 2004 by wired connection 2006. Connection 2006 may include Ethernet hardware, coaxial cable hardware, DSL hardware, T-1 hardware, fiber optic hardware, analog phone line hardware, any other suitable wired hardware capable of communicating, or any combination thereof. Connection 2006 may include transmission techniques including TCP/IP transmission techniques, IEEE 2102 transmission techniques, Ethernet transmission techniques, DSL transmission techniques, fiber optic transmission techniques, ITU-T transmission techniques, any other suitable transmission techniques, or any combination thereof.

User device 2002 may be wirelessly coupled to network 2004 by wireless connection 2008. In some implementations, wireless repeater 2010 receives transmitted information from user device 2002 by wireless connection 2008 and communicates it with network 2004 by connection 2012. Wireless repeater 2010 receives information from network 2004 by connection 2012 and communicates it with user device 2002 by wireless connection 2008. In some implementations, wireless connection 2008 may include cellular phone transmission techniques, code division multiple access or CDMA transmission techniques, global system for mobile communications or GSM transmission techniques, general packet radio service or GPRS transmission techniques, satellite transmission techniques, infrared transmission techniques, Bluetooth transmission techniques, Wi-Fi transmission techniques, WiMax transmission techniques, any other suitable transmission techniques, or any combination thereof.

Connection 2012 may include Ethernet hardware, coaxial cable hardware, DSL hardware, T-1 hardware, fiber optic hardware, analog phone line hardware, wireless hardware, any other suitable hardware capable of communicating, or any combination thereof. Connection 2012 may include wired transmission techniques including TCP/IP transmission techniques, IEEE 2102 transmission techniques, Ethernet transmission techniques, DSL transmission techniques, fiber optic transmission techniques, ITU-T transmission techniques, any other suitable transmission techniques, or any combination thereof. Connection 2012 may include may include wireless transmission techniques including cellular phone transmission techniques, code division multiple access or CDMA transmission techniques, global system for mobile communications or GSM transmission techniques, general packet radio service or GPRS transmission techniques, satellite transmission techniques, infrared transmission techniques, Bluetooth transmission techniques, Wi-Fi transmission techniques, WiMax transmission techniques, any other suitable transmission techniques, or any combination thereof.

Wireless repeater 2010 may include any number of cellular phone transceivers, network routers, network switches, communication satellites, other devices for communicating information from user device 2002 to network 2004, or any combination thereof. It will be understood that the arrangement of connection 2006, wireless connection 2008 and connection 2012 is merely illustrative and that system 2000 may include any suitable number of any suitable devices coupling user device 2002 to network 2004. It will also be understood that any user device 2002, may be communicatively coupled with any user device, remote server, local server, any other suitable processing equipment, or any combination thereof, and may be coupled using any suitable technique as described above.

In some implementations, any suitable number of remote servers 2014, 2016, 2018, 2020, may be coupled to network 2004. Remote servers may be general purpose, specific, or any combination thereof. One or more search engine servers 2022 may be coupled to the network 2004. In some implementations, search engine server 2022 may include the knowledge graph, may include processing equipment configured to access the knowledge graph, may include processing equipment configured to receive search queries related to the knowledge graph, may include any other suitable information or equipment, or any combination thereof. One or more database servers 2024 may be coupled to network 2004. In some implementations, database server 2024 may store the knowledge graph. In some implementations, where there is more than one knowledge graph, the more than one may be included in database server 2024, may be distributed across any suitable number of database servers and general purpose servers by any suitable technique, or any combination thereof. It will also be understood that the search system may use any suitable number of general purpose, specific purpose, storage, processing, search, any other suitable server, or any combination.

FIG. 21 is a block diagram of a user device of the illustrative computer system of FIG. 20 in accordance with some implementations of the present disclosure. User device 2002 may include input/output equipment 2102 and processing equipment 2104. Input/output equipment 2102 may include display 2106, touchscreen 2108, button 2110, accelerometer 2112, global positions system or GPS receiver 2136, camera 2138, keyboard 2140, mouse 2142, and audio equipment 2134 including speaker 2114 and microphone 2116. In some implementations, the equipment illustrated in FIG. 21 may be representative of equipment included in a smartphone user device. It will be understood that the specific equipment included in the illustrative computer system may depend on the style of user device. For example, the Input/output equipment 2102 of a desktop computer may include a keyboard 2140 and mouse 2142 and may omit accelerometer 2112 and GPS receiver 2136. It will be understood that user device 2002 may omit any suitable illustrated elements, and may include equipment not shown such as media drives, data storage, communication devices, display devices, processing equipment, any other suitable equipment, or any combination thereof.

In some implementations, display 2106 may include a liquid crystal display, light emitting diode display, organic light emitting diode display, amorphous organic light emitting diode display, plasma display, cathode ray tube display, projector display, any other suitable display capable of displaying content, or any combination thereof. Display 2106 may be controlled by display controller 2118 or by processor 2124 in processing equipment 2104, by processing equipment internal to display 2106, by other controlling equipment, or by any combination thereof. In some implementations, display 2106 may display data from a knowledge graph.

Touchscreen 2108 may include a sensor capable of sensing pressure input, capacitance input, resistance input, piezoelectric input, optical input, acoustic input, any other suitable input, or any combination thereof. Touchscreen 2108 may be capable of receiving touch-based gestures. Received gestures may include information relating to one or more locations on the surface of touchscreen 2108, pressure of the gesture, speed of the gesture, duration of the gesture, direction of paths traced on its surface by the gesture, motion of the device in relation to the gesture, other suitable information regarding a gesture, or any combination thereof. In some implementations, touchscreen 2108 may be optically transparent and located above or below display 2106. Touchscreen 2108 may be coupled to and controlled by display controller 2118, sensor controller 2120, processor 2124, any other suitable controller, or any combination thereof. In some implementations, touchscreen 2108 may include a virtual keyboard capable of receiving, for example, a search query used to identify data in a knowledge graph.

In some embodiments, a gesture received by touchscreen 2108 may cause a corresponding display element to be displayed substantially concurrently, i.e., immediately following or with a short delay, by display 2106. For example, when the gesture is a movement of a finger or stylus along the surface of touchscreen 2108, the search system may cause a visible line of any suitable thickness, color, or pattern indicating the path of the gesture to be displayed on display 2106. In some implementations, for example, a desktop computer using a mouse, the functions of the touchscreen may be fully or partially replaced using a mouse pointer displayed on the display screen.

Button 2110 may be one or more electromechanical push-button mechanism, slide mechanism, switch mechanism, rocker mechanism, toggle mechanism, other suitable mechanism, or any combination thereof. Button 2110 may be included in touchscreen 2108 as a predefined region of the touchscreen, e.g. soft keys. Button 2110 may be included in touchscreen 2108 as a region of the touchscreen defined by the search system and indicated by display 2106. Activation of button 2110 may send a signal to sensor controller 2120, processor 2124, display controller 2120, any other suitable processing equipment, or any combination thereof. Activation of button 2110 may include receiving from the user a pushing gesture, sliding gesture, touching gesture, pressing gesture, time-based gesture, e.g. based on the duration of a push, any other suitable gesture, or any combination thereof.

Accelerometer 2112 may be capable of receiving information about the motion characteristics, acceleration characteristics, orientation characteristics, inclination characteristics and other suitable characteristics, or any combination thereof, of user device 2002. Accelerometer 2112 may be a mechanical device, microelectromechanical or MEMS device, nanoelectromechanical or NEMS device, solid state device, any other suitable sensing device, or any combination thereof. In some implementations, accelerometer 2112 may be a 3-axis piezoelectric microelectromechanical integrated circuit which is configured to sense acceleration, orientation, or other suitable characteristics by sensing a change in the capacitance of an internal structure. Accelerometer 2112 may be coupled to touchscreen 2108 such that information received by accelerometer 2112 with respect to a gesture is used at least in part by processing equipment 2104 to interpret the gesture.

Global positioning system or GPS receiver 2136 may be capable of receiving signals from global positioning satellites. In some implementations, GPS receiver 2136 may receive information from one or more satellites orbiting the earth, the information including time, orbit, and other information related to the satellite. This information may be used to calculate the location of user device 2002 on the surface of the earth. GPS receiver 2136 may include a barometer, not shown, to improve the accuracy of the location. GPS receiver 2136 may receive information from other wired and wireless communication sources regarding the location of user device 2002. For example, the identity and location of nearby cellular phone towers may be used in place of, or in addition to, GPS data to determine the location of user device 2002.

Camera 2138 may include one or more sensors to detect light. In some implementations, camera 2138 may receive video images, still images, or both. Camera 2138 may include a charged coupled device or CCD sensor, a complementary metal oxide semiconductor or CMOS sensor, a photocell sensor, an IR sensor, any other suitable sensor, or any combination thereof. In some implementations, camera 2138 may include a device capable of generating light to illuminate a subject, for example, an LED light. Camera 2138 may communicate information captured by the one or more sensor to sensor controller 2120, to processor 2124, to any other suitable equipment, or any combination thereof. Camera 2138 may include lenses, filters, and other suitable optical equipment. It will be understood that user device 2002 may include any suitable number of camera 2138.

Audio equipment 2134 may include sensors and processing equipment for receiving and transmitting information using acoustic or pressure waves. Speaker 2114 may include equipment to produce acoustic waves in response to a signal. In some implementations, speaker 2114 may include an electroacoustic transducer wherein an electromagnet is coupled to a diaphragm to produce acoustic waves in response to an electrical signal. Microphone 2116 may include electroacoustic equipment to convert acoustic signals into electrical signals. In some implementations, a condenser-style microphone may use a diaphragm as a portion of a capacitor such that acoustic waves induce a capacitance change in the device, which may be used as an input signal by user device 2002.

Speaker 2114 and microphone 2116 may be contained within user device 2002, may be remote devices coupled to user device 2002 by any suitable wired or wireless connection, or any combination thereof.

Speaker 2114 and microphone 2116 of audio equipment 2134 may be coupled to audio controller 2122 in processing equipment 2104. This controller may send and receive signals from audio equipment 2134 and perform pre-processing and filtering steps before transmitting signals related to the input signals to processor 2124. Speaker 2114 and microphone 2116 may be coupled directly to processor 2124. Connections from audio equipment 2134 to processing equipment 2104 may be wired, wireless, other suitable arrangements for communicating information, or any combination thereof.

Processing equipment 2104 of user device 2002 may include display controller 2118, sensor controller 2120, audio controller 2122, processor 2124, memory 2126, communication controller 2128, and power supply 2132.

Processor 2124 may include circuitry to interpret signals input to user device 2002 from, for example, touchscreen 2108 and microphone 2116. Processor 2124 may include circuitry to control the output to display 2106 and speaker 2114. Processor 2124 may include circuitry to carry out instructions of a computer program. In some implementations, processor 2124 may be an integrated electronic circuit based, capable of carrying out the instructions of a computer program and include a plurality of inputs and outputs.

Processor 2124 may be coupled to memory 2126. Memory 2126 may include random access memory or RAM, flash memory, programmable read only memory or PROM, erasable programmable read only memory or EPROM, magnetic hard disk drives, magnetic tape cassettes, magnetic floppy disks optical CD-ROM discs, CD-R discs, CD-RW discs, DVD discs, DVD+R discs, DVD-R discs, any other suitable storage medium, or any combination thereof.

The functions of display controller 2118, sensor controller 2120, and audio controller 2122, as have been described above, may be fully or partially implemented as discrete components in user device 2002, fully or partially integrated into processor 2124, combined in part or in full into combined control units, or any combination thereof.

Communication controller 2128 may be coupled to processor 2124 of user device 2002. In some implementations, communication controller 2128 may communicate radio frequency signals using antenna 2130. In some implementations, communication controller 2128 may communicate signals using a wired connection, not shown. Wired and wireless communications communicated by communication controller 2128 may use Ethernet, amplitude modulation, frequency modulation, bit stream, code division multiple access or CDMA, global system for mobile communications or GSM, general packet radio service or GPRS, satellite, infrared, Bluetooth, Wi-Fi, WiMax, any other suitable communication configuration, or any combination thereof. The functions of communication controller 2128 may be fully or partially implemented as a discrete component in user device 2002, may be fully or partially included in processor 2124, or any combination thereof. In some implementations, communication controller 2128 may communicate with a network such as network 2004 of FIG. 20 and may receive information from a knowledge graph stored, for example, in database 2024 of FIG. 20.

Power supply 2132 may be coupled to processor 2124 and to other components of user device 2002. Power supply 2132 may include a lithium-polymer battery, lithium-ion battery, NiMH battery, alkaline battery, lead-acid battery, fuel cell, solar panel, thermoelectric generator, any other suitable power source, or any combination thereof. Power supply 2132 may include a hard wired connection to an electrical power source, and may include electrical equipment to convert the voltage, frequency, and phase of the electrical power source input to suitable power for user device 2002. In some implementations of power supply 2132, a wall outlet may provide 120V, 60 Hz alternating current or AC. A circuit of transformers, resistors, inductors, capacitors, transistors, and other suitable electronic components included in power supply 2132 may convert the 120V AC from a wall outlet power to 5 volts at 0 Hz, i.e., direct current. In some implementations of power supply 2132, a lithium-ion battery including a lithium metal oxide-based cathode and graphite-based anode may supply 3.7V to the components of user device 2002. Power supply 2132 may be fully or partially integrated into user device 2002, or may function as a stand-alone device. Power supply 2132 may power user device 2002 directly, may power user device 2002 by charging a battery, may provide power by any other suitable way, or any combination thereof.

The foregoing is merely illustrative of the principles of this disclosure and various modifications may be made by those skilled in the art without departing from the scope of this disclosure. The above described implementations are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A computer-implemented method, the computer-implemented method comprising:
   receiving a search query from a computing device;
   parsing the search query to identify an entity type;
   retrieving search results based on the search query;
   ranking the search results based at least in part on an implicit modifying concept related to the entity type, wherein the implicit modifying concept is not included as an independent word or phrase in the search query;
   generating a display of the search results based on ranking the search results, wherein each of the search results includes a thumbnail link in the display; and
   causing the display of the search results to be presented at the computing device.

2. The computer-implemented method as in claim 1, wherein the implicit modifying concept related to the entity type is based on a popularity measure.

3. The computer-implemented method as in claim 1, wherein the implicit modifying concept comprises a range filter.

4. The computer-implemented method as in claim 1, wherein:
   generating the display of the search results includes generating a horizontally scrollable display of the search results based on ranking the search results; and
   causing the display of the search results includes causing the display of the horizontally scrollable display of the search results to be presented at the computing device.

5. The computer-implemented method as in claim 1, wherein:
   generating the display of the search results includes generating an image gallery of the search results based on ranking the search results; and
   causing the display of the search results includes causing the display of the image gallery of the search results to be presented at the computing device.

6. The computer-implemented method as in claim 5, wherein:
   generating the image gallery of the search results includes generating a horizontally scrollable display of the image gallery of the search results based on ranking the search results; and
   causing the display of the image gallery includes causing the display of the horizontally scrollable display of the image gallery of the search results to be presented at the computing device.

7. A system, comprising:
   a database comprising data; and
   one or more computers configured to perform operations comprising:
      receiving a search query from a computing device;
      parsing the search query to identify an entity type;

retrieving search results based on the search query;
ranking the search results based at least in part on an implicit modifying concept related to the entity type, wherein the implicit modifying concept is not included as an independent word or phrase in the search query;
generating a display of the search results based on ranking the search results, wherein each of the search results includes a thumbnail link in the display; and
causing the display of the search results to be presented at the computing device.

8. The system of claim 7, wherein the implicit modifying concept related to the entity type is based on a popularity measure.

9. The system of claim 7, wherein the implicit modifying concept comprises a range filter.

10. The system of claim 7, wherein:
generating the display of the search results includes generating a horizontally scrollable display of the search results based on ranking the search results; and
causing the display of the search results includes causing the display of the horizontally scrollable display of the search results to be presented at the computing device.

11. The system of claim 7, wherein:
generating the display of the search results includes generating an image gallery of the search results based on ranking the search results; and
causing the display of the search results includes causing the display of the image gallery of the search results to be presented at the computing device.

12. The system of claim 11, wherein:
generating the image gallery of the search results includes generating a horizontally scrollable display of the image gallery of the search results based on ranking the search results; and
causing the display of the image gallery includes causing the display of the horizontally scrollable display of the image gallery of the search results to be presented at the computing device.

13. One or more non-transitory computer storage media encoded with computer program instructions that when executed by one or more computers cause the one or more computers to perform operations comprising:
receiving a search query from a computing device;
parsing the search query to identify an entity type;
retrieving search results based on the search query;
ranking the search results based at least in part on an implicit modifying concept related to the entity type, wherein the implicit modifying concept is not included as an independent word or phrase in the search query;
generating a display of the search results based on ranking the search results, wherein each of the search results includes a thumbnail link in the display; and
causing the display of the search results to be presented at the computing device.

14. The one or more non-transitory computer storage media of claim 13, wherein the implicit modifying concept related to the entity type is based on a popularity measure.

15. The one or more non-transitory computer storage media of claim 13, wherein the implicit modifying concept comprises a range filter.

16. The one or more non-transitory computer storage media of claim 13, wherein:
generating the display of the search results includes generating a horizontally scrollable display of the search results based on ranking the search results; and
causing the display of the search results includes causing the display of the horizontally scrollable display of the search results to be presented at the computing device.

17. The one or more non-transitory computer storage media of claim 13, wherein:
generating the display of the search results includes generating an image gallery of the search results based on ranking the search results; and
causing the display of the search results includes causing the display of the image gallery of the search results to be presented at the computing device.

18. The one or more non-transitory computer storage media of claim 17, wherein:
generating the image gallery of the search results includes generating a horizontally scrollable display of the image gallery of the search results based on ranking the search results; and
causing the display of the image gallery includes causing the display of the horizontally scrollable display of the image gallery of the search results to be presented at the computing device.

* * * * *